(12) United States Patent
Chen et al.

(10) Patent No.: US 11,770,337 B2
(45) Date of Patent: Sep. 26, 2023

(54) PACKET REFLECT SYSTEM

(71) Applicant: Dell Products L.P., Round Rock, TX (US)

(72) Inventors: Chi Chen, Chengdu (CN); Jianfei Yang, Chengdu (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/345,393

(22) Filed: Jun. 11, 2021

(65) Prior Publication Data

US 2022/0385574 A1  Dec. 1, 2022

(30) Foreign Application Priority Data

May 28, 2021 (CN) .......................... 202110588877.7

(51) Int. Cl.
*H04L 45/745* (2022.01)

(52) U.S. Cl.
CPC .................................. *H04L 45/745* (2013.01)

(58) Field of Classification Search
None
See application file for complete search history.

(56) References Cited

U.S. PATENT DOCUMENTS

| | | | | |
|---|---|---|---|---|
| 10,389,643 | B1 * | 8/2019 | Matthews | ................ H04L 45/74 |
| 2007/0192507 | A1 * | 8/2007 | DiBiasio | ............. H04L 47/2475 |
| | | | | 709/238 |
| 2010/0183014 | A1 * | 7/2010 | Shua | ....................... H04L 63/12 |
| | | | | 370/395.3 |

(Continued)

FOREIGN PATENT DOCUMENTS

| | | |
|---|---|---|
| CN | 102347898 A | 2/2012 |
| CN | 111355666 A | 6/2020 |

OTHER PUBLICATIONS

ETSI, "Digital cellular telecommunications system (Phase 2+) (GSM); Universal Mobile Telecommunications System (UMTS); LTE; Interworking between the IP Multimedia (IM) Core Network (CN) subsystem and Circuit Switched (CS) networks (3GPP TS 29.163 version 8.32.0 Release 8)," Technical Specification, ETSI TS 129 163 V8.32.0 (Jan. 2019), Reference RTS/TSGC-0329163v8w0, 288 pages.

*Primary Examiner* — Oleg Survillo
*Assistant Examiner* — Monishwar Mohan
(74) *Attorney, Agent, or Firm* — Joseph Mencher

(57) ABSTRACT

A packet reflect subsystem in a server device receives a host Ethernet packet generated by a host from a networking device, provides an entry in a packet reflect table that includes a networking device address from the host Ethernet packet, generates a host IP packet based on the host Ethernet packet and including an entry identifier for the entry, and transmits the host IP packet to a packet processing subsystem in the server device. The packet processing subsystem then generates a server IP packet including the entry identifier and transmits it to the packet reflect subsystem. The packet reflect subsystem then uses the entry identifier to identify the entry in the packet reflect table, retrieves the networking device address from the entry, and generates and transmits a server Ethernet packet to the networking device using the networking device address.

20 Claims, 27 Drawing Sheets

(56) References Cited

U.S. PATENT DOCUMENTS

| | | | |
|---|---|---|---|
| 2014/0307736 A1* | 10/2014 | Krishnan | H04L 45/745 370/392 |
| 2016/0006639 A1* | 1/2016 | Wallman | H04L 43/18 370/241.1 |
| 2016/0006656 A1* | 1/2016 | Yan | H04L 45/64 370/392 |
| 2016/0072717 A1 | 3/2016 | Ansari et al. | |
| 2017/0063681 A1* | 3/2017 | Kaplan | H04L 45/74 |
| 2019/0342207 A1 | 11/2019 | Wang et al. | |
| 2020/0112477 A1* | 4/2020 | Bhatt | G06F 16/288 |
| 2020/0136967 A1* | 4/2020 | Zhang | H04L 61/103 |
| 2021/0321469 A1* | 10/2021 | Padebettu | H04L 12/2859 |

\* cited by examiner

PACKET REFLECT SYSTEM

CROSS-REFERENCE TO RELATED APPLICATIONS

The present application claims priority to Chinese Patent Application Serial No. 202110588877.7, filed on May 28, 2021, the disclosure of which is incorporated herein by reference in its entirety.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, Network Attached Storage (NAS) server devices and/or other computing device known in the art, sometimes perform packet reflect operations in order to respond to incoming data packets with outgoing data packets. As would be appreciated by one of skill in the art in possession of the present disclosure, packet reflect operations performed by NAS server devices provide for the sending of such outgoing data packets back to the same host device via a networking device (e.g., a router device that couples the server device to the host device) from which the corresponding incoming packets were directly received, which eliminates the need for the NAS server device to perform routing table and Address Resolution Protocol (ARP) table lookups when replying to incoming data packets, and thus eliminates the need to perform corresponding routing configuration operations.

For example, an incoming Ethernet data packet received by the NAS server device from the host device via a router device may include a host Internet Protocol (IP) address of the host device as a source IP address, a NAS server IP address of the NAS server device as a destination IP address, and a router Media Access Control (MAC) address of the router device as a next-hop MAC address, and conventional packet reflect functionality in the NAS server device will operate to associate that host IP address, NAS server IP address, and router MAC address in a packet reflect table entry in a packet reflect table, while using the Ethernet data packet to generate an IP data packet that includes the host IP address as a source IP address and the NAS server IP address as a destination IP address, and providing that IP data packet to NAS functionality in the NAS server device. When the NAS functionality then replies to the incoming data packet with an outgoing data packet, it generates an IP data packet with the NAS server IP address of the NAS server device as a source IP address and the host IP address of the host device as a destination IP address, and provides that IP data packet to the conventional packet reflect functionality in the NAS server device.

The conventional packet reflect functionality in the NAS server device will then identify the host IP address and NAS server IP address that are included in the IP data packet received from the NAS server device, use that host IP address and NAS server IP address to identify a corresponding packet reflect table entry in the packet reflect table, retrieve the router MAC address associated with that host IP address and NAS server IP address in that packet reflect table entry in the packet reflect table, and generate an outgoing Ethernet data packet that includes the NAS server IP address of the NAS server device as a source IP address, the host IP address of the host device as a destination address, and the router MAC address of the router device as a next-hop MAC address, which one of skill in the art in possession of the present disclosure will appreciate allows the NAS server device to transmit that outgoing Ethernet data packet to the router device that routed the corresponding incoming Ethernet data packet from the host device to the NAS server device.

As such, packet reflect operations allow the NAS server device to transmit outgoing data packets to the router device with the router MAC address from which the corresponding incoming data packet was received regardless of the destination IP address provided in those outgoing data packets. Thus, when an incoming data packet is received from a router device that is not identified in the routing table in the NAS server device, the corresponding outgoing data packet will be transmitted to that router device independent of the destination IP address in that outgoing data packet (i.e., the return path of the outgoing data packet is not influenced by the routing table in the NAS server device). However, when packet reflect operations are disabled, the path of the outgoing data packet will be determined by the destination IP address in the outgoing data packet and the routing table in the NAS server device (i.e., outgoing data packet transmission routes are influenced by the routing table in the NAS server device when packet reflect operations are disabled) and, as such, outgoing data packets may be transmitted to a router device that did not provide the corresponding incoming data packet.

Furthermore, incoming data packets generated by the same host device may be routed via different router devices to the NAS server device when multiple router devices couple that host device to the NAS server device, which results in the packet reflect table in the NAS server device being populated with multiple packet reflect table entries that each have the same host IP address of that host device, the same NAS server IP address of that NAS server device, but different router MAC addresses (i.e., the different router MAC addresses of the different router devices that provided the incoming data packets to the NAS server device). In such situations, when the NAS server device provides an outgoing data packet including the host IP address and NAS server IP address discussed above, there will be multiple packet reflect table entries in the packet reflect table with that host IP address and NAS server IP address, and conventional packet reflect functionality operates to utilize the router MAC address that is included in the first packet reflect table entry in the packet reflect table.

As will be appreciated by one of skill in the art in possession of the present disclosure, this conventional packet reflect behavior can result in the outgoing data packet being sent via a router device that did not provide the corresponding incoming data packet, the use of "stale" or "dead" router MAC address information that can result in the loss of data (i.e., when the first packet reflect table entry in the packet reflect table identifies MAC address that is no longer available), the sending of all outgoing data packets corresponding to different incoming data packets provided by different router devices to the same router device that can lead to congestion in that router device and which can result in data packet delay and/or loss, and/or a variety of other issues that would be apparent to one of skill in the art in possession of the present disclosure.

Accordingly, it would be desirable to provide a packet reflect system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a packet reflect engine that is configured to: receive, from a first networking device, a first host Ethernet data packet that was generated by a host device; provide, in a packet reflect table based on the first host Ethernet data packet, a first packet reflect table entry that includes a first networking device address of the first networking device; generate, based on the first host Ethernet data packet, a first host Internet Protocol (IP) data packet that includes a first packet reflect table entry identifier for the first packet reflect table entry; transmit, to a packet processing engine, the first host IP data packet; receive, from the packet processing engine, a first IHS IP data packet including the first packet reflect table entry identifier; use the first packet reflect table entry identifier to identify the first packet reflect table entry in the packet reflect table; retrieve, from the first packet reflect table entry, the first networking device address; and generate and transmit, to the first networking device using the first networking device address, a first IHS Ethernet data packet.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
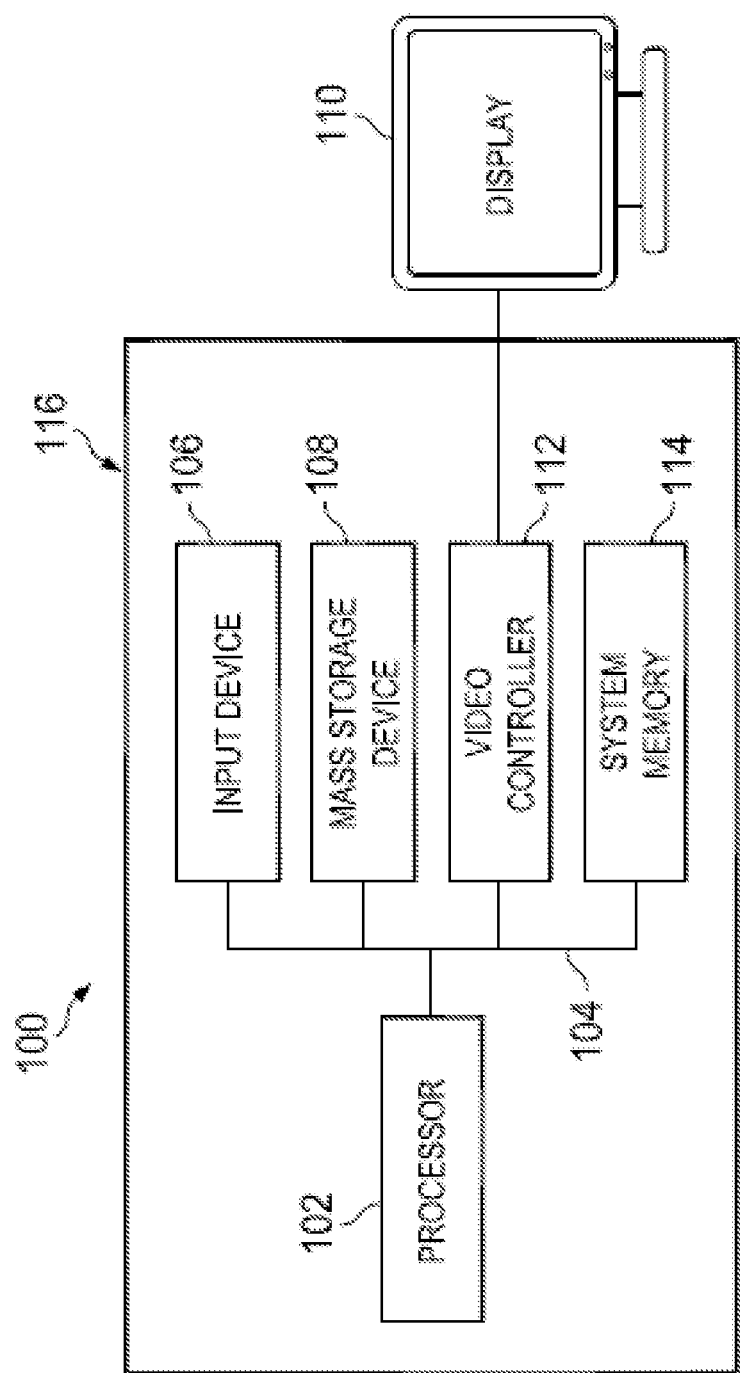
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
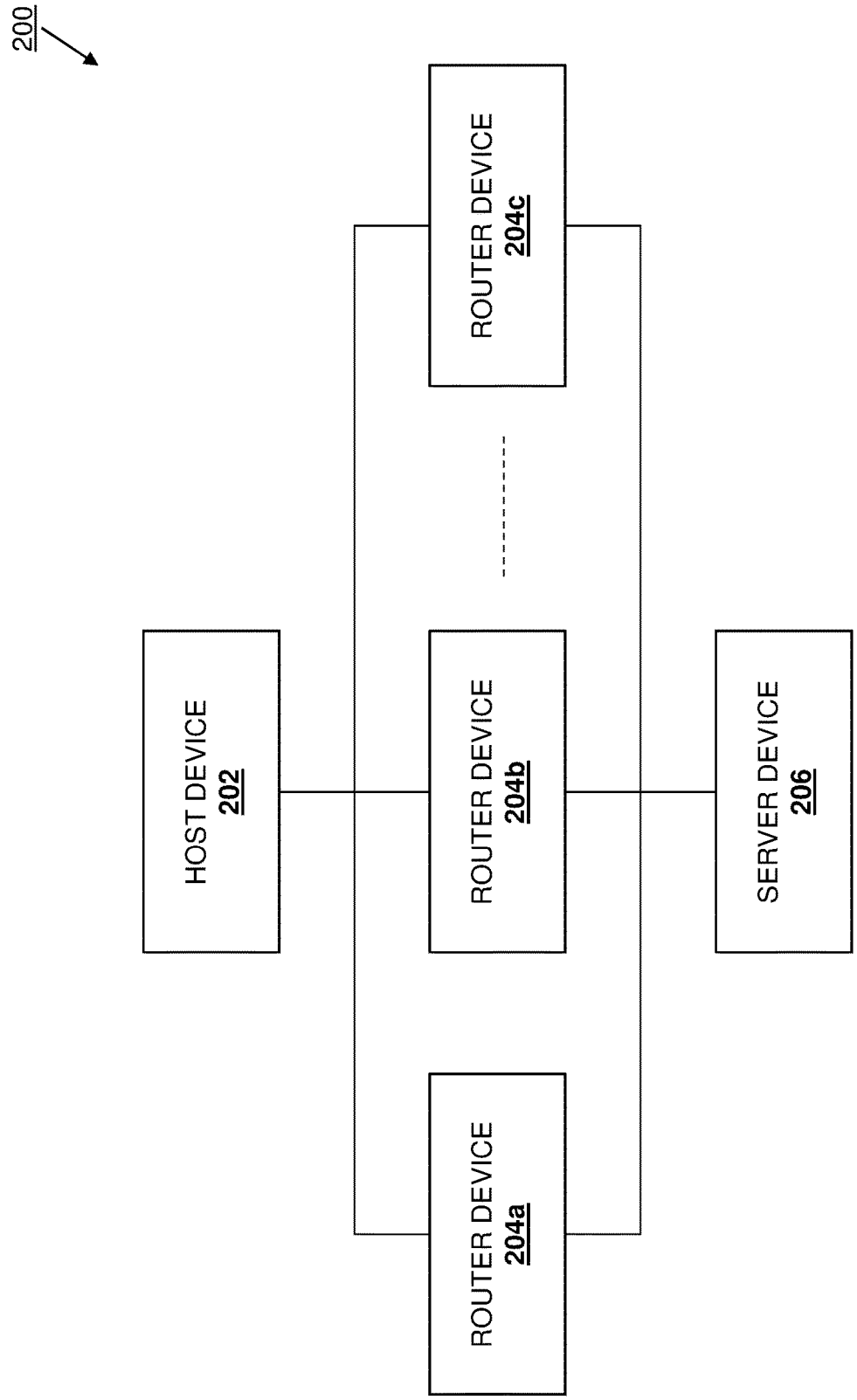
FIG. 2 is a schematic view illustrating an embodiment of a networked system that may utilize the packet reflect system of the present disclosure.

Referring now to FIG. 2, an embodiment of a networked system 200 is illustrated. In the illustrated embodiment, the networked system 200 includes a host device 202. In an embodiment, the host device 202 may be provided by the IHS 100 discussed above with reference to FIG. 1, and/or may include some or all of the components of the IHS 100, and in specific examples may be provide by desktop computing devices, laptop/notebook computing devices, tablet computing devices, mobile phones, and/or any of variety of other host computing devices known in the art. However, while illustrated and discussed as being provided by particular computing devices, one of skill in the art in possession of the present disclosure will recognize that host devices transmitting incoming data packets that are responded to in the networked system 200 using the packet reflect functionality described herein may include any devices that may be configured to operate similarly as the host device 202 discussed below. The host device 202 may be coupled to a plurality of networking device that are provided by router devices 204a, 204b, and up to 204c in the examples discussed below. In an embodiment, each of the router devices 204a-204c may be provided by the IHS 100 discussed above with reference to FIG. 1, and/or may include some or all of the components of the IHS 100, and while illustrated as router devices, one of skill in the art in possession of the present disclosure will recognize that data packets may be transmitted to and from the host device 202 by any of a variety of networking devices that may be configured to operate similarly as the router devices 204a-204c discussed below.

In the illustrated embodiment, a server device 206 is coupled to the plurality of router devices 204a-204c. In an embodiment, the server device 206 may be provided by the IHS 100 discussed above with reference to FIG. 1, and/or may include some or all of the components of the IHS 100, and in specific examples below is described as being provided by Network Attached Storage (NAS) server device. However, while illustrated and discussed below as being provided by a NAS server device, one of skill in the art in possession of the present disclosure will recognize that server devices in the networked system 200 that utilize the packet reflect functionality described herein may include any computing devices that may be configured to operate similarly as the server device 206 discussed below. Furthermore, while a specific networked system 200 has been illustrated and described, one of skill in the art in possession of the present disclosure will recognize that the packet reflect system of the present disclosure may include a variety of components and component configurations while remaining within the scope of the present disclosure as well.

Figure 3:
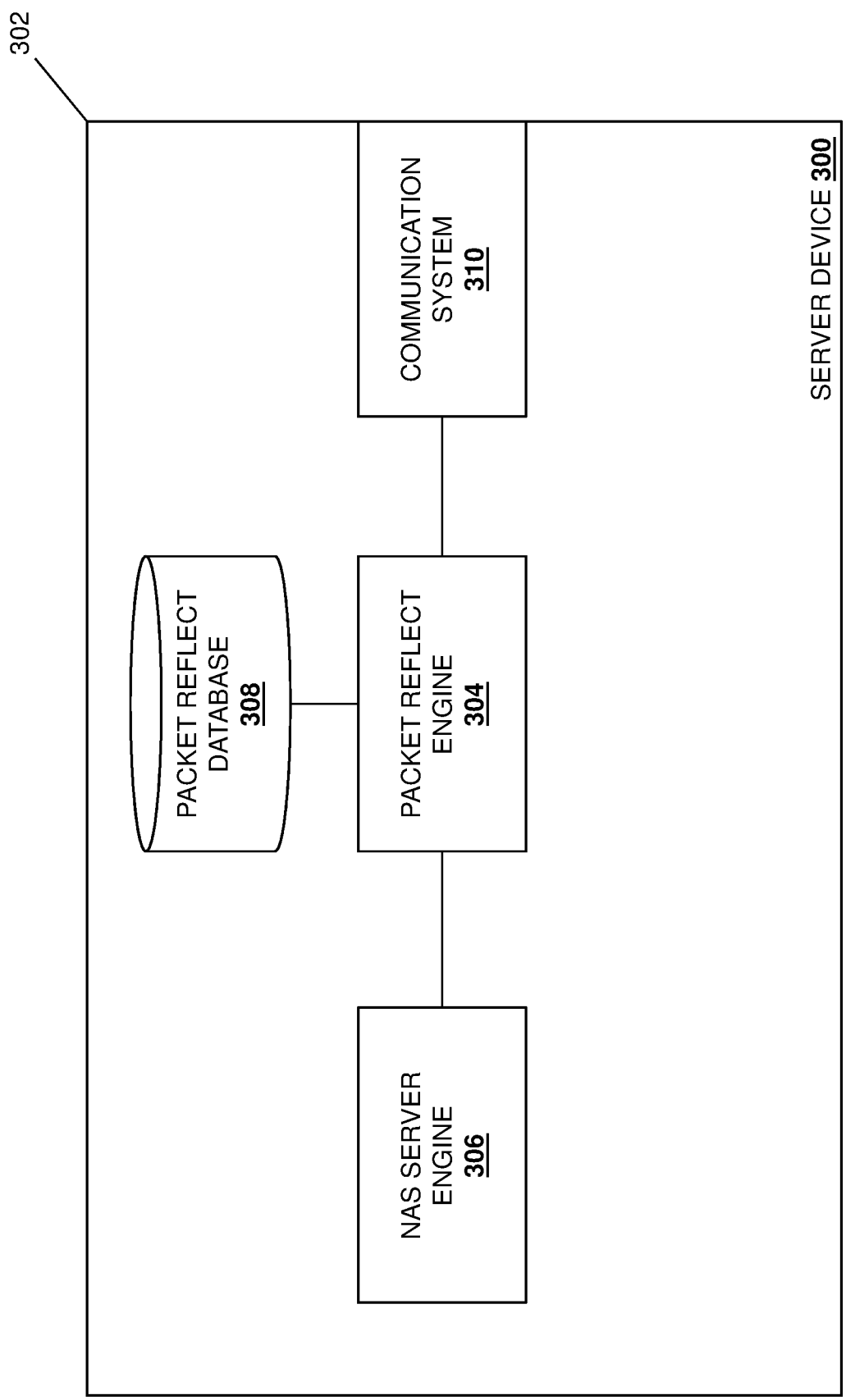
FIG. 3 is a schematic view illustrating an embodiment of a server device that may be included in the networked system of FIG. 2.

Referring now to FIG. 3, an embodiment of a server device 300 is illustrated that may provide the server device 206 discussed above with reference to FIG. 2. As such, the server device 300 may be provided by the IHS 100 discussed above with reference to FIG. 1 and/or may include some or all of the components of the IHS 100, and in the specific examples below is described as being provided by a NAS server device. However, while illustrated and discussed as being provided by a NAS server device, one of skill in the art in possession of the present disclosure will recognize that the functionality of the server device 300 discussed below may be provided by other computing devices that are configured to operate similarly as the server device 300 discussed below. In the illustrated embodiment, the server device 300 includes a chassis 302 that houses the components of the server device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a packet reflect engine 304 (or other packet reflect subsystem) that is configured to perform the functionality of the packet reflect engines/subsystems and/or server devices discussed below.

Furthermore, the memory system may also include instructions that, when executed by the processing system, cause the processing system to provide a NAS server engine 306 that is coupled to the packet reflect engine 304 and that is configured to perform the functionality of the NAS server engines (or other NAS server subsystems) and/or server devices discussed below. However, while described as a NAS server engine 306, one of skill in the art in possession of the present disclosure will recognize that the NAS server engine 306 may be replaced by any of a variety of packet processing engines/subsystems known in the art in order to allow the packet reflect functionality of the packet reflect engine 304 to be utilized with a server device (or other computing device) that is configured to provide that packet processing functionality (i.e., rather than the NAS server functionality described below).

The chassis 302 may also house a storage system (not illustrated, but which may include the storage 108 discussed above with reference to FIG. 1) that is coupled to the packet reflect engine 304 (e.g., via a coupling between the storage system and the processing system) and that includes a packet reflect database 308 that is configured to store the packet reflect table and/or any of the information utilized by the packet reflect engine 304 discussed below. The chassis 302 may also house a communication system 310 that is coupled to the packet reflect engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
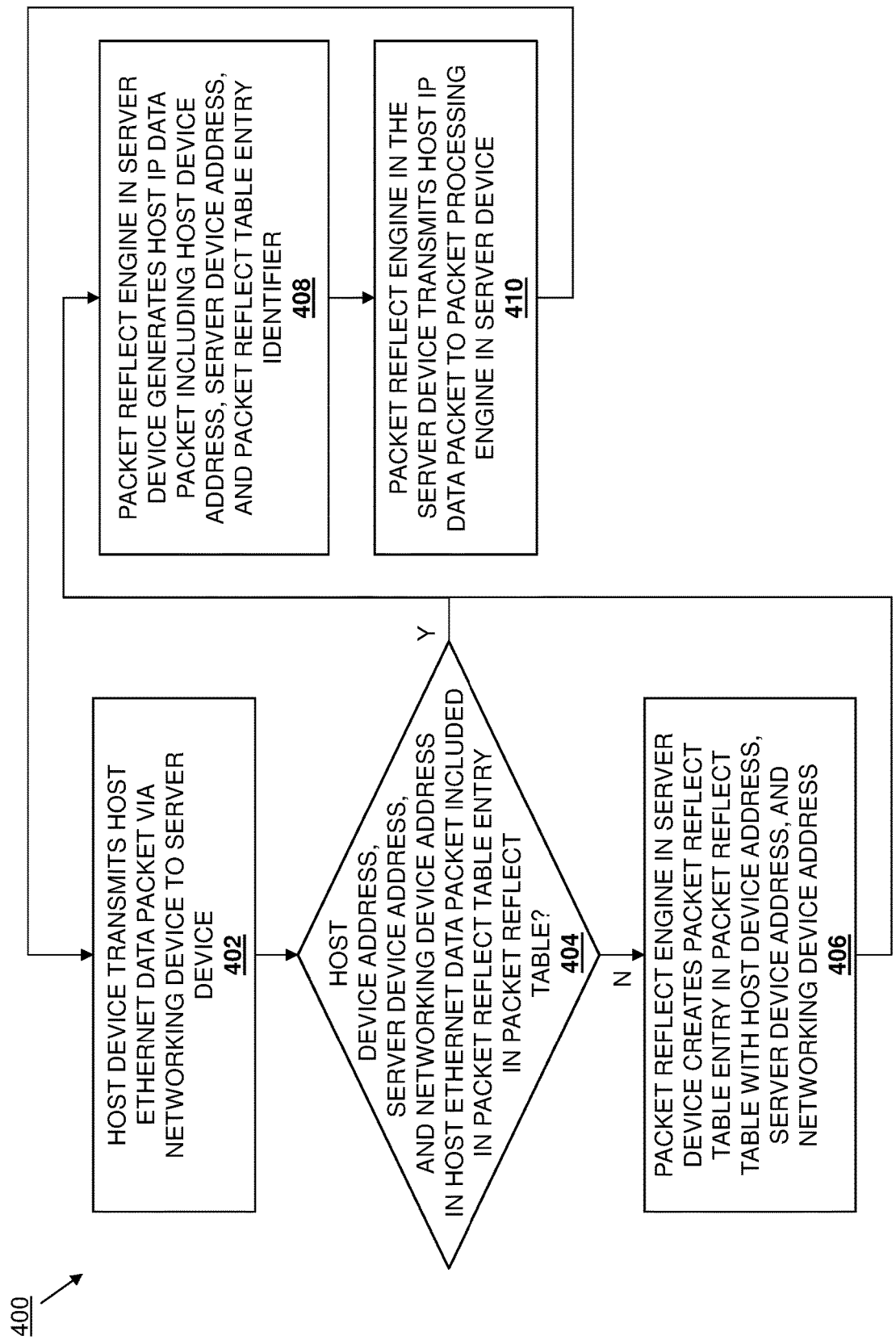
FIG. 4 is a flow chart illustrating an embodiment of a method for performing packet reflect operations.
Figure 5A:
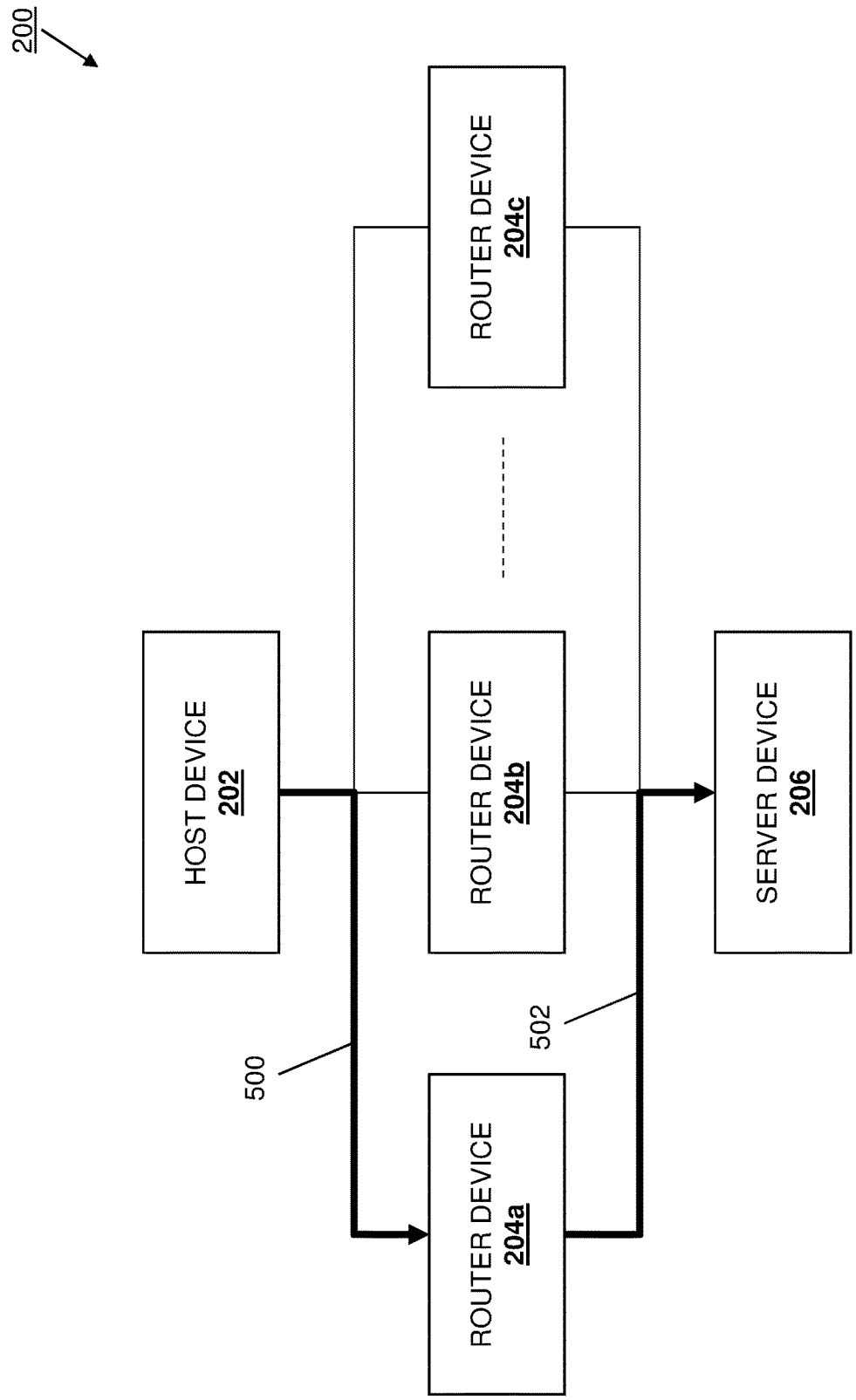
FIG. 5A is a schematic view illustrating an embodiment of the networked system of FIG. 2 operating during the method of FIG. 4.
Figure 5B:
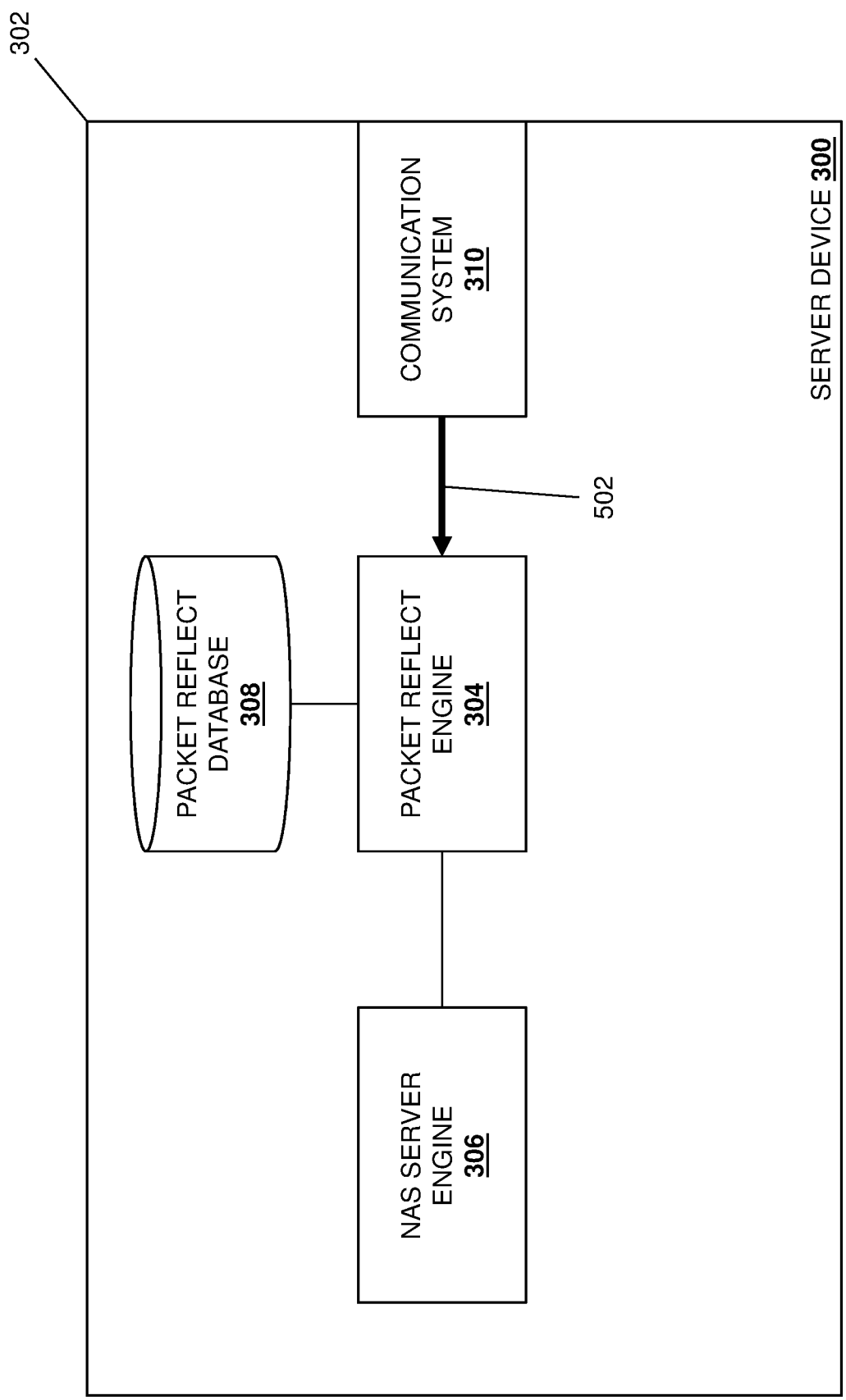
FIG. 5B is a schematic view illustrating an embodiment of the server device of FIG. 3 operating during the method of FIG. 4.

Referring now to FIG. 4, an embodiment of a method 400 for performing packet reflect operations is illustrated. As discussed below, the systems and methods of the present disclosure provide packet reflect functionality that, in response to receiving host Ethernet data packets from different networking devices, creates packet reflect table entries in a packet reflect table that are configured to be identified by packet reflect table entry identifiers that distinguish between the different networking device addresses of the different networking devices from which those host Ethernet data packets were received, generates corresponding host IP data packets that include the packet reflect table entry identifier generated for their corresponding host Ethernet data packet, and transmits those host IP data packets to packet processing functionality. For example, the packet reflect system of the present disclosure may include a packet reflect subsystem in a server device that receives a host Ethernet packet generated by a host from a networking device, provides an entry in a packet reflect table that includes a networking device address from the host Ethernet packet, generates a host IP packet based on the host Ethernet packet and including an entry identifier for the entry, and transmits the host IP packet to a packet processing subsystem in the server device. As discussed below, multiple packet reflect table entries may be created in packet reflect table and may be distinguished based on the networking device that transmitted the host Ethernet data packets from which those packet reflect table entries are created, allowing corresponding server Ethernet data packets to be transmitted back to the networking devices that provided those host Ethernet data packets The method 400 begins at block 402 where a host device transmits a host Ethernet data packet via a networking device to a server device. With reference to FIG. 5A, in an embodiment of block 402 during a particular performance of the method 400, the host device 202 may generate a host Ethernet data packet that is destined for the server device 206, which one of skill in the art in possession of the present disclosure will recognize may include an Ethernet data packet header having a host device IP address of host device as its source IP address, and a server device IP address of the server device as its destination IP address. The host device 202 may then perform host Ethernet data packet transmission operations 500 that include transmitting the host Ethernet data packet to the router device 204a in this embodiment. In response to receiving the host Ethernet data packet, the router device 204a may provide a router device MAC address of the router device 204a in that host Ethernet data packet as a next-hop MAC address, and may perform host Ethernet data packet forwarding operations 502 to forward that host Ethernet data packet to the server device 206. As such, the packet reflect engine 304 in the server device 206/300 may receive that host Ethernet data packet via its communication system 310 as part of the Ethernet data packet forwarding operations 502, as illustrated in FIG. 5B.

Figure 6A:
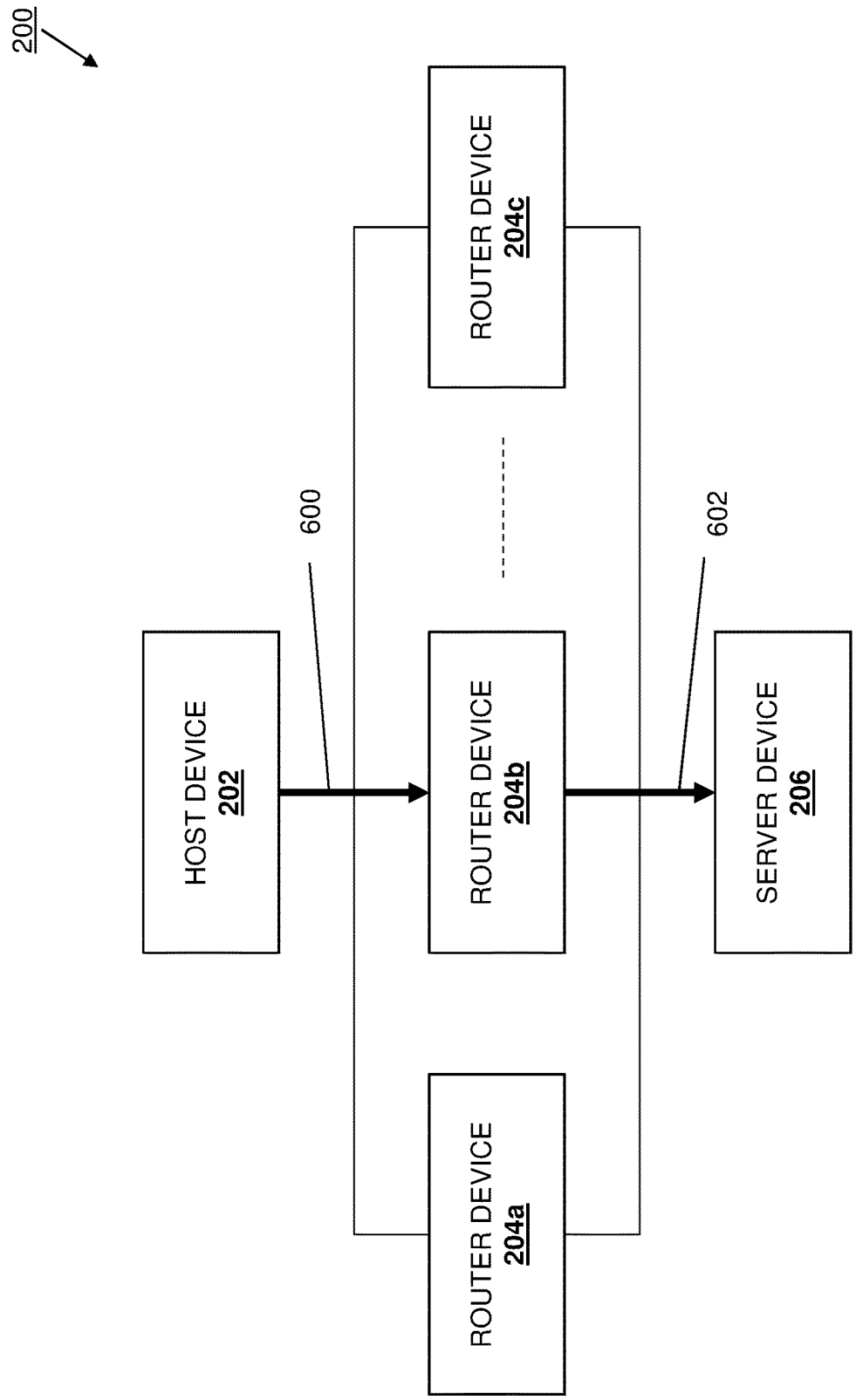
FIG. 6A is a schematic view illustrating an embodiment of the networked system of FIG. 2 operating during the method of FIG. 4.
Figure 6B:
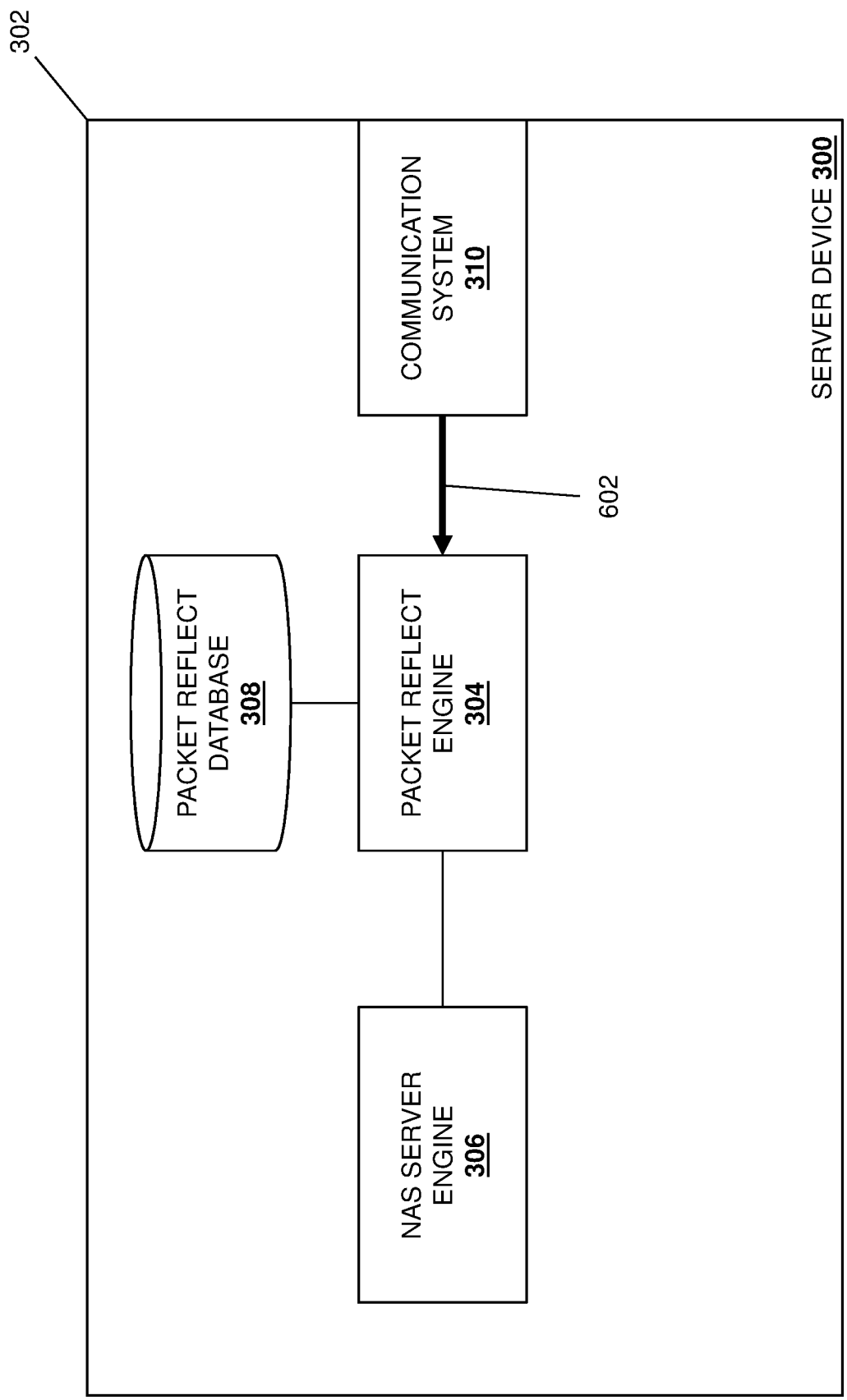
FIG. 6B is a schematic view illustrating an embodiment of the server device of FIG. 3 operating during the method of FIG. 4.

Similarly, with reference to FIG. 6A, in an embodiment of block 402 during a particular performance of the method 400, the host device 202 may generate a host Ethernet data packet that is destined for the server device 206, which one of skill in the art in possession of the present disclosure will recognize may include an Ethernet data packet header having a host device IP address of host device as its source IP address, and a server device IP address of the server device as its destination IP address. The host device 202 may then perform host Ethernet data packet transmission operations 600 that include transmitting the host Ethernet data packet to the router device 204b in this embodiment. In response to receiving the host Ethernet data packet, the router device 204b may provide a router device MAC address of the router device 204b in that host Ethernet data packet as a next-hop MAC address, and may perform host Ethernet data packet forwarding operations 602 to forward that host Ethernet data packet to the server device 206. As such, the packet reflect engine 304 in the server device 206/300 may receive that host Ethernet data packet via its communication system 310 as part of the Ethernet data packet forwarding operations 602, as illustrated in FIG. 6B.

Figure 7A:
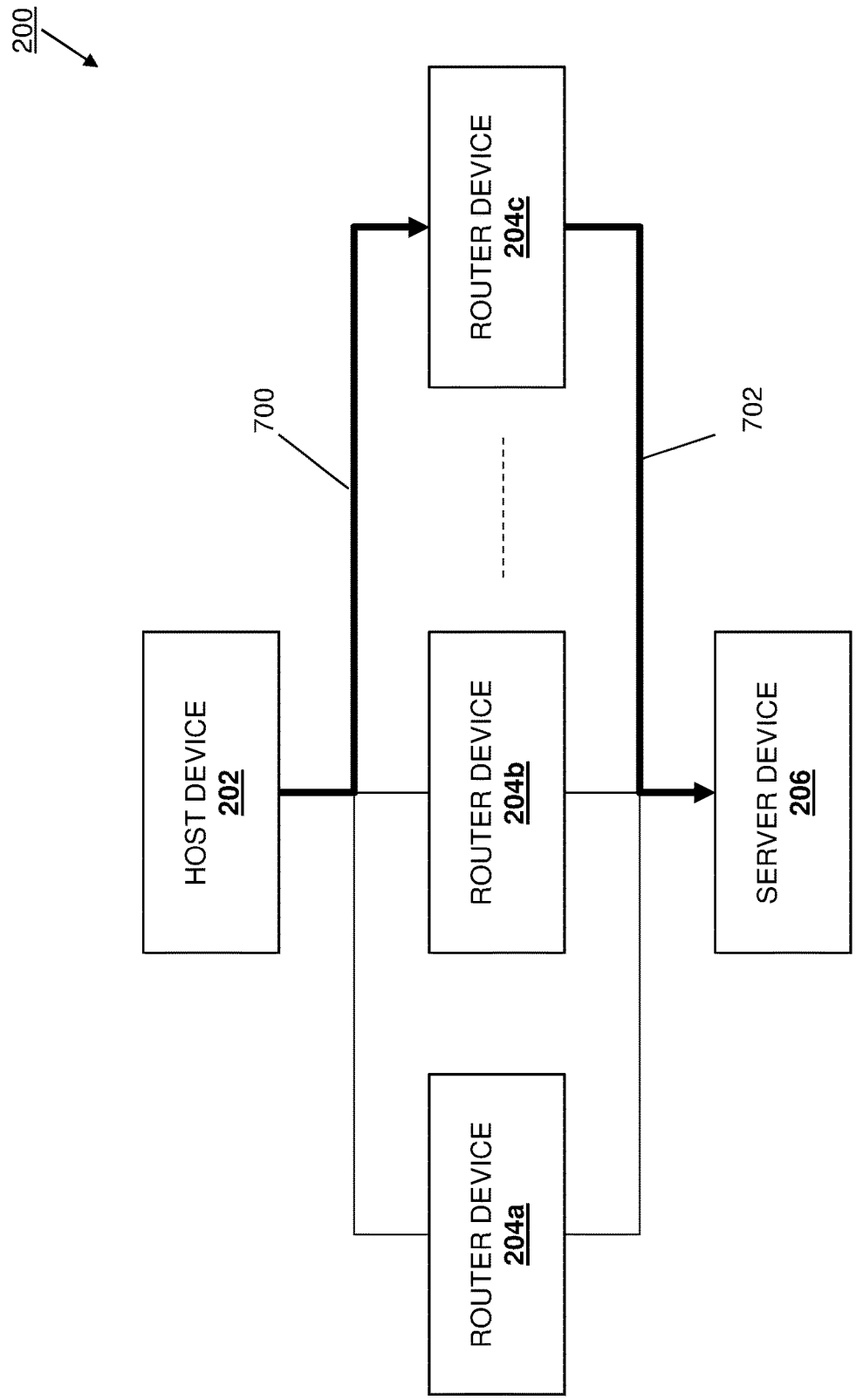
FIG. 7A is a schematic view illustrating an embodiment of the networked system of FIG. 2 operating during the method of FIG. 4.
Figure 7B:
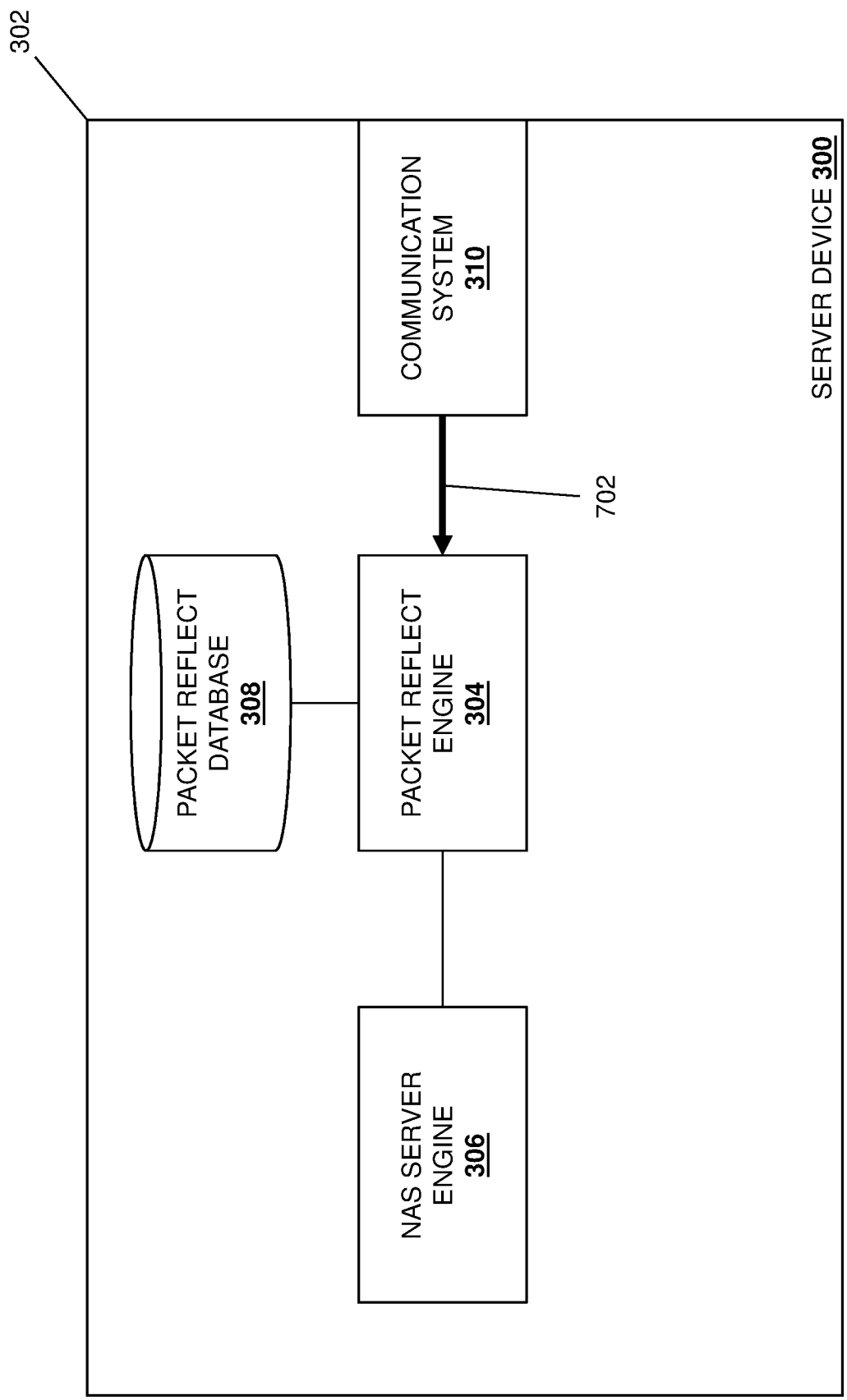
FIG. 7B is a schematic view illustrating an embodiment of the server device of FIG. 3 operating during the method of FIG. 4.

Similarly as well, with reference to FIG. 7A, in an embodiment of block 402 during a particular performance of the method 400, the host device 202 may generate a host Ethernet data packet that is destined for the server device 206, which one of skill in the art in possession of the present disclosure will recognize may include an Ethernet data packet header having a host device IP address of host device as its source IP address, and a server device IP address of the server device as its destination IP address. The host device 202 may then perform host Ethernet data packet transmission operations 700 that include transmitting the host Ethernet data packet to the router device 204c in this embodiment. In response to receiving the host Ethernet data packet, the router device 204c may provide a router device MAC address of the router device 204c in that host Ethernet data packet as a next-hop MAC address, and may perform host Ethernet data packet forwarding operations 702 to forward that host Ethernet data packet to the server device 206. As such, the packet reflect engine 304 in the server device 206/300 may receive that host Ethernet data packet via its communication system 310 as part of the Ethernet data packet forwarding operations 702, as illustrated in FIG. 7B.

The method 400 then proceeds to decision block 406 where it is determined whether a host device address, a server device address, and a networking device address in the Ethernet data packet header of the host Ethernet data packet are included in a packet reflect table entry in a packet reflect table. In an embodiment, at decision block 406, the packet reflect engine 304 in the server device 206/300 may operate to identify the host device IP address of the host device provided as the source IP address in the Ethernet data packet header of the host Ethernet data packet, the server device IP address of the server device provided as the destination IP address in the Ethernet data packet header of the host Ethernet data packet, and the router device MAC address of the router device provided as the next-hop MAC address in the Ethernet data packet header of the host Ethernet data packet, and may perform packet reflect table entry determination operations to determine whether a packet reflect table entry is included in a packet reflect table in the packet reflect database 308 that associates that host device IP address, that server device IP address, and that router device MAC address.

Figure 5C:
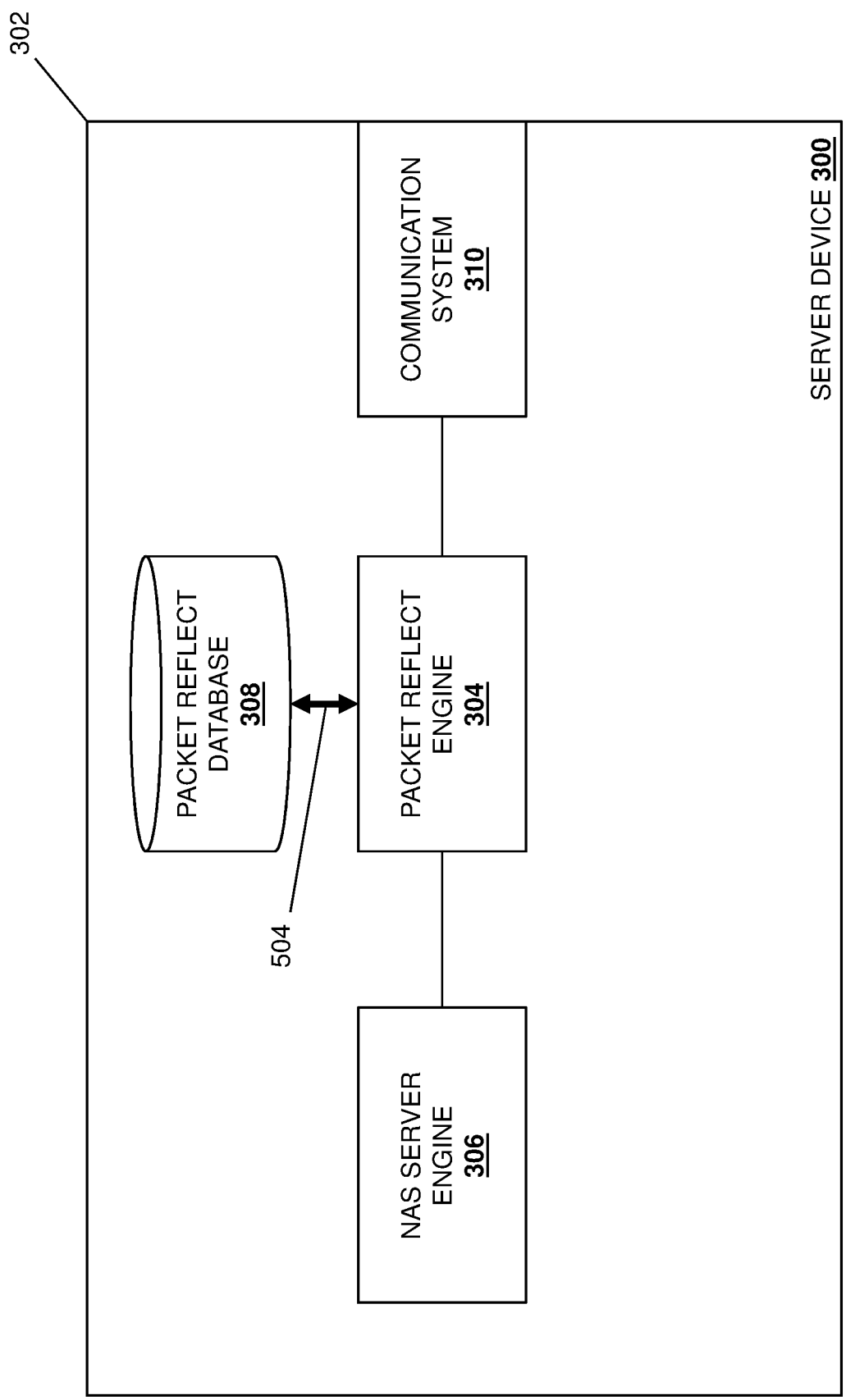
FIG. 5C is a schematic view illustrating an embodiment of the server device of FIG. 3 operating during the method of FIG. 4.
Figure 6C:
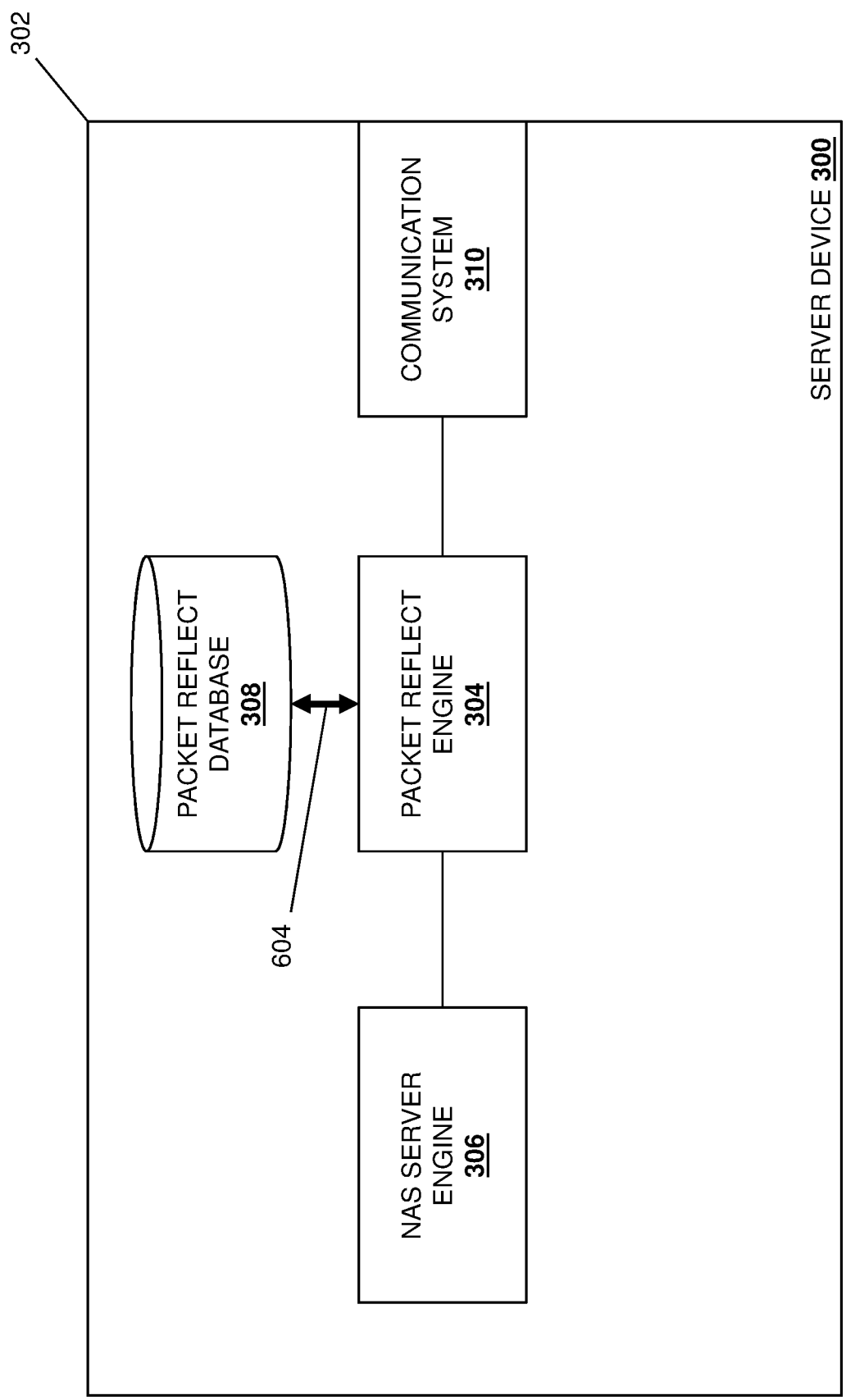
FIG. 6C is a schematic view illustrating an embodiment of the server device of FIG. 3 operating during the method of FIG. 4.
Figure 7C:
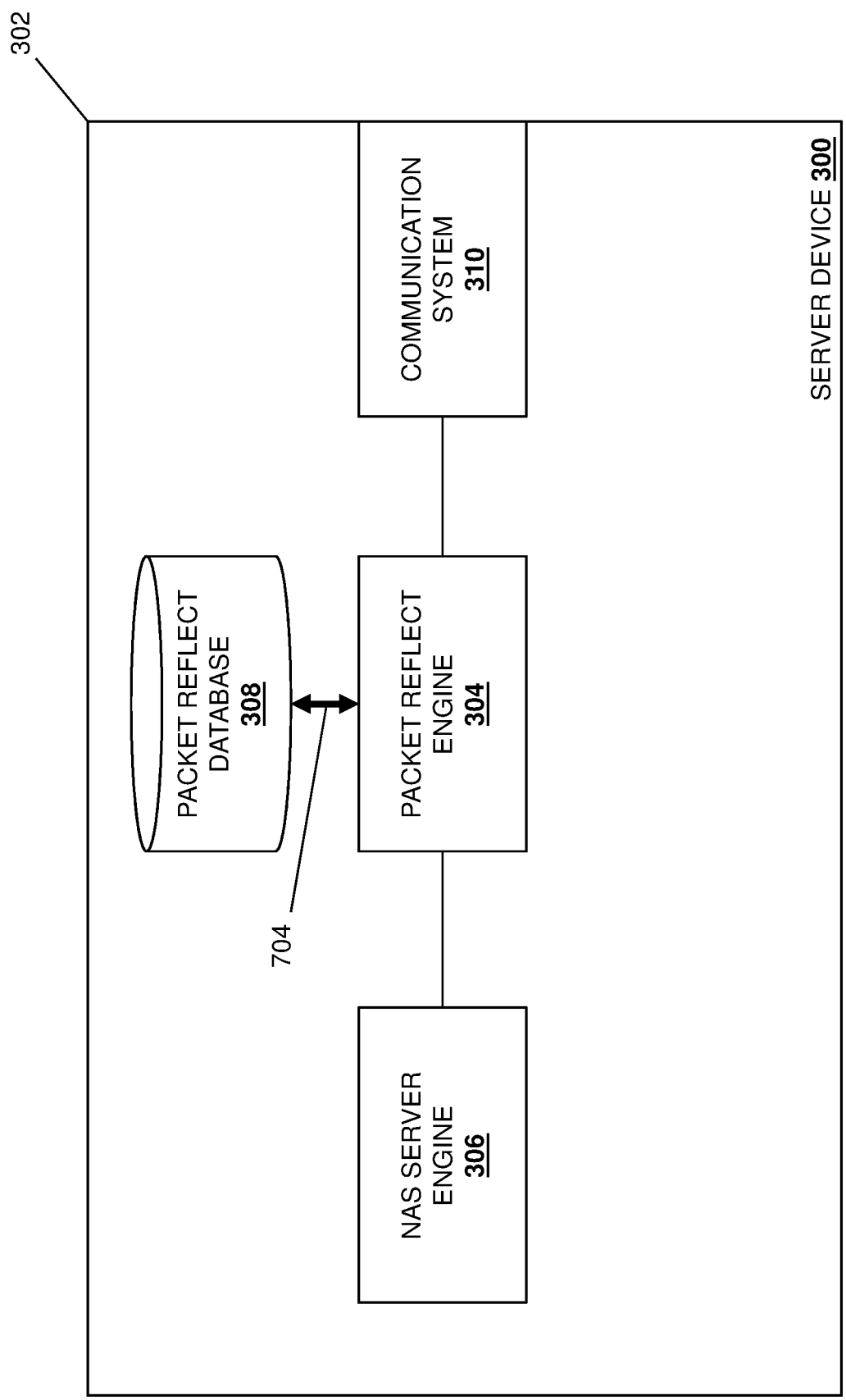
FIG. 7C is a schematic view illustrating an embodiment of the server device of FIG. 3 operating during the method of FIG. 4.

As such, with reference to FIG. 5C and the particular performance of the method 400 described above with reference to FIGS. 5A and 5B, the packet reflect engine 304 may perform packet reflect table entry determination operations 504 to determine whether a packet reflect table in the packet reflect database 308 includes a packet reflect table entry that associates the host device IP address of the host device 202, the server device IP address of the server device 206, and the router device MAC address of the router device 204a. Similarly, with reference to FIG. 6C and the particular performance of the method 400 described above with reference to FIGS. 6A and 6B, the packet reflect engine 304 may perform packet reflect table entry determination operations 604 to determine whether a packet reflect table in the packet reflect database 308 includes a packet reflect table entry that associates the host device IP address of the host device 202, the server device IP address of the server device 206, and the router device MAC address of the router device 204b. Similarly as well, with reference to FIG. 7C and the particular performance of the method 400 described above with reference to FIGS. 7A and 7B, the packet reflect engine 304 may perform packet reflect table entry determination operations 704 to determine whether a packet reflect table in the packet reflect database 308 includes a packet reflect table entry that associates the host device IP address of the host device 202, the server device IP address of the server device 206, and the router device MAC address of the router device 204c.

Figure 5D:
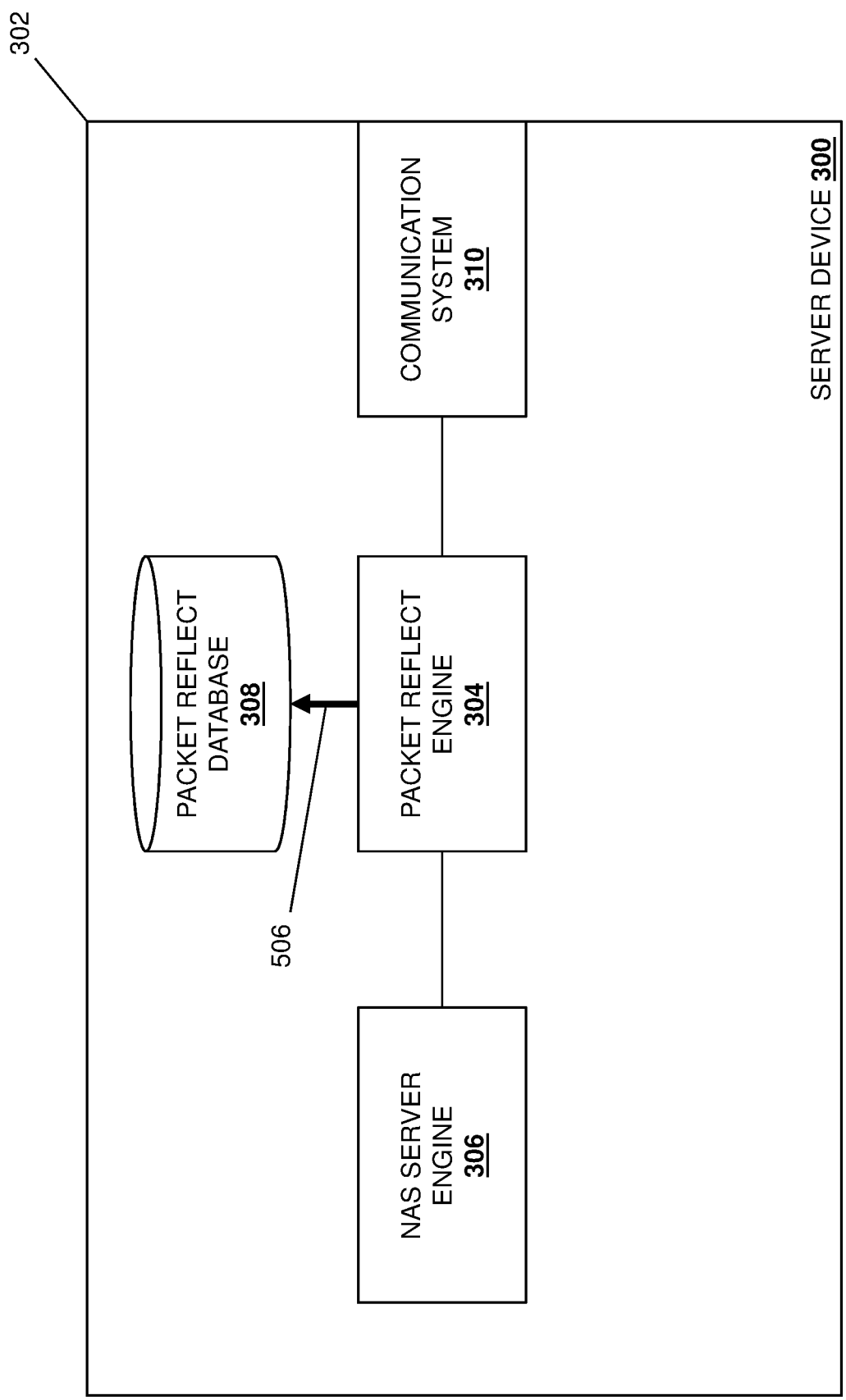
FIG. 5D is a schematic view illustrating an embodiment of the server device of FIG. 3 operating during the method of FIG. 4.

If, at decision block 406, it is determined that the host device address, the server device address, and the networking device address in the host Ethernet data packet are not included in a packet reflect table entry in the packet reflect table, the method 400 proceeds to block 406 where a packet reflect engine in the server device creates a packet reflect table entry in the packet reflect table with the host device address, the server device address, and the networking device address. With reference to FIG. 5D and the particular performance of the method 400 described above with reference to FIGS. 5A-5C, in an embodiment of block 406 and in response to determining that the packet reflect table in the packet reflect database 308 does not include a packet reflect table entry that associates the host device IP address of the host device 202, the server device IP address of the server device 206, and the router device MAC address of the router device 204a, the packet reflect engine 304 may perform packet reflect table entry creation operations 506 to create a packet reflect table entry that associates the host device IP address of the host device 202, the server device IP address of the server device 206, and the router device MAC address of the router device 204a.

Figure 6D:
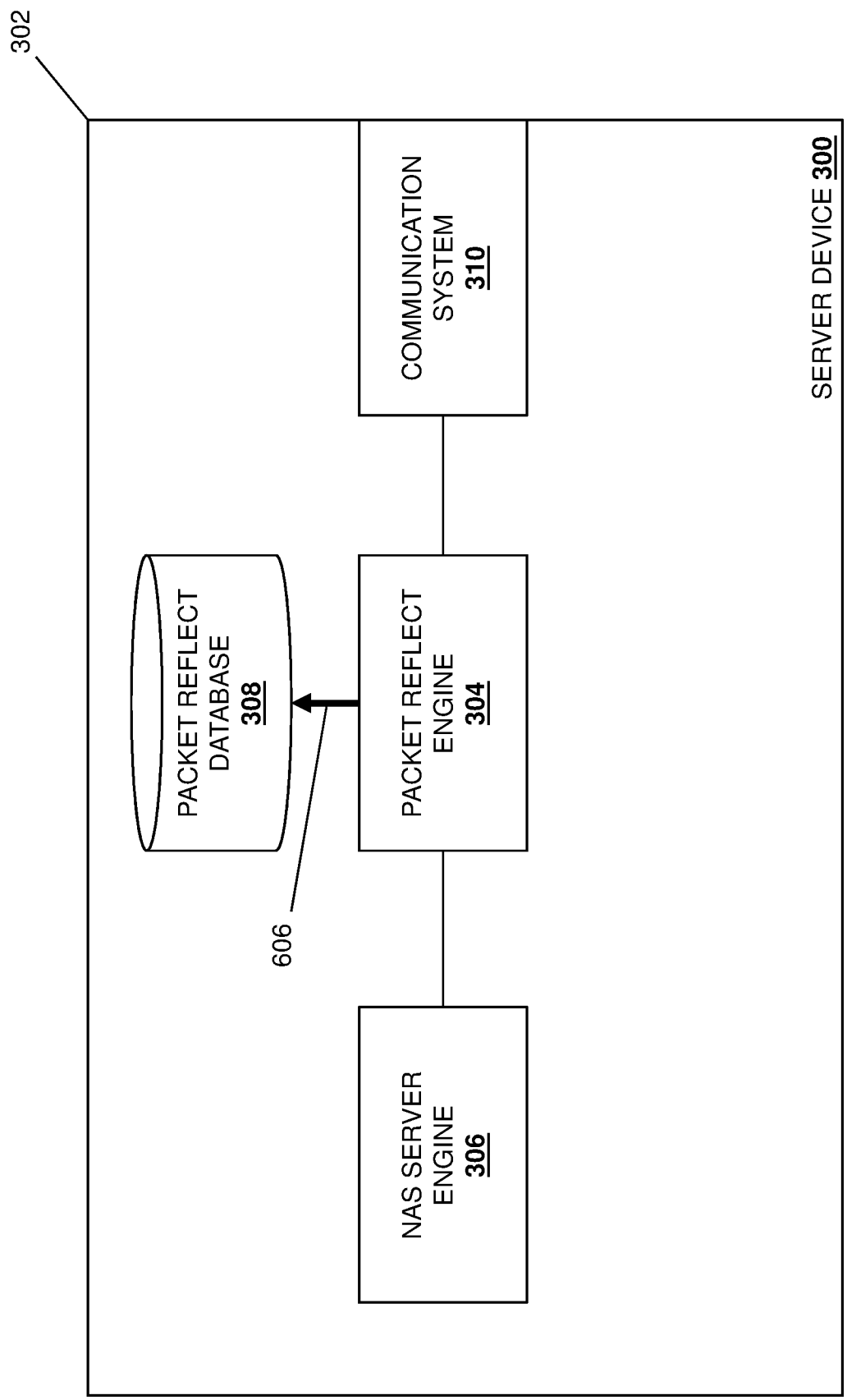
FIG. 6D is a schematic view illustrating an embodiment of the server device of FIG. 3 operating during the method of FIG. 4.
Figure 7D:
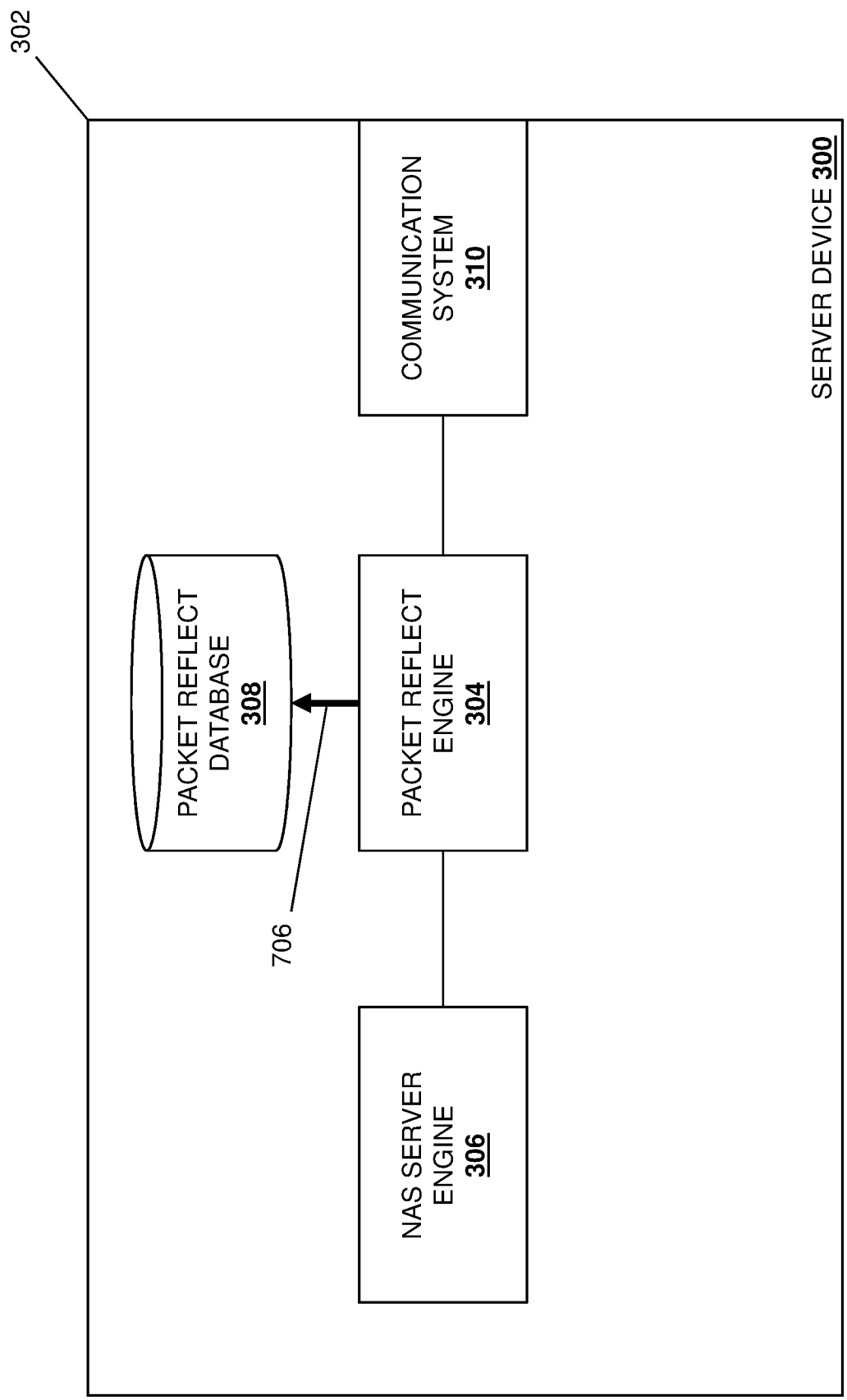
FIG. 7D is a schematic view illustrating an embodiment of the server device of FIG. 3 operating during the method of FIG. 4.

Similarly, with reference to FIG. 6D and the particular performance of the method 400 described above with reference to FIGS. 6A-6C, in an embodiment of block 406 and in response to determining that the packet reflect table in the packet reflect database 308 does not include a packet reflect table entry that associates the host device IP address of the host device 202, the server device IP address of the server device 206, and the router device MAC address of the router device 204b, the packet reflect engine 304 may perform packet reflect table entry creation operations 606 to create a packet reflect table entry that associates the host device IP address of the host device 202, the server device IP address of the server device 206, and the router device MAC address of the router device 204b. Similarly as well, with reference to FIG. 7D and the particular performance of the method 400 described above with reference to FIGS. 7A-7C, in an embodiment of block 406 and in response to determining that the packet reflect table in the packet reflect database 308 does not include a packet reflect table entry that associates the host device IP address of the host device 202, the server device IP address of the server device 206, and the router device MAC address of the router device 204c, the packet reflect engine 304 may perform packet reflect table entry creation operations 706 to create a packet reflect table entry that associates the host device IP address of the host device 202, the server device IP address of the server device 206, and the router device MAC address of the router device 204c.

Figure 5E:
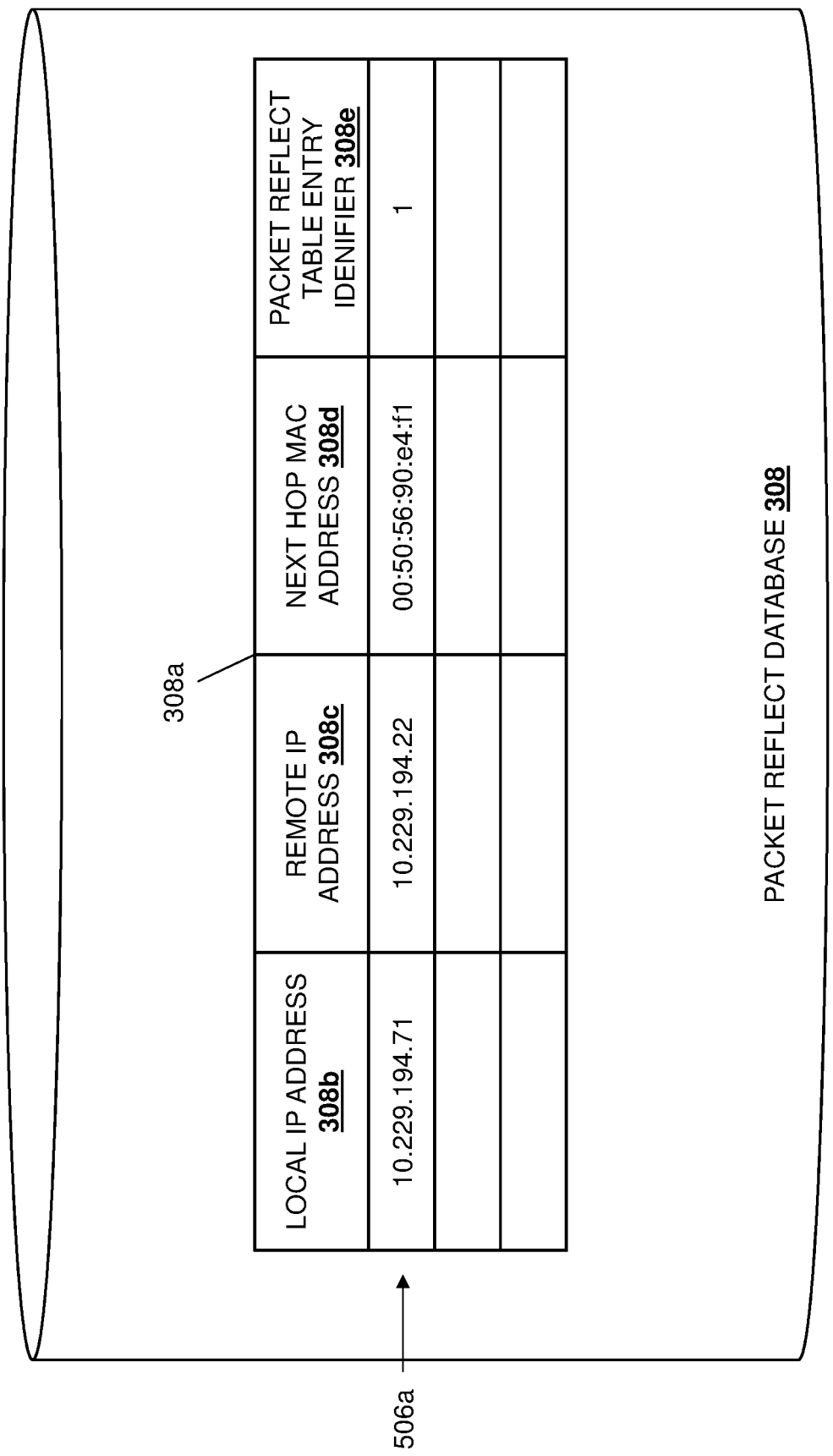
FIG. 5E is a schematic view illustrating an embodiment of a database in the server device of FIG. 3 during the method of FIG. 4.
Figure 6E:
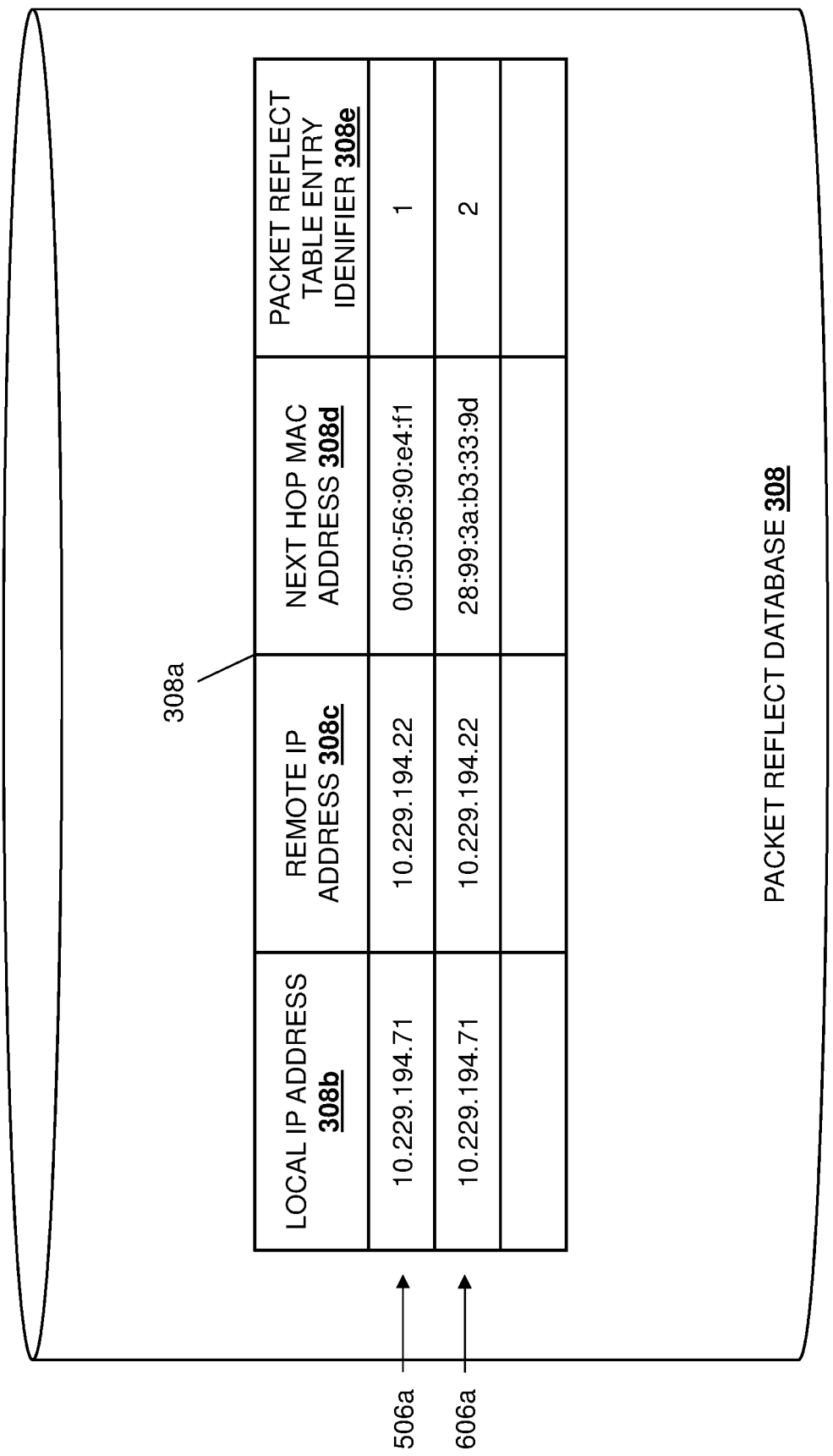
FIG. 6E is a schematic view illustrating an embodiment of a database in the server device of FIG. 3 during the method of FIG. 4.
Figure 7E:
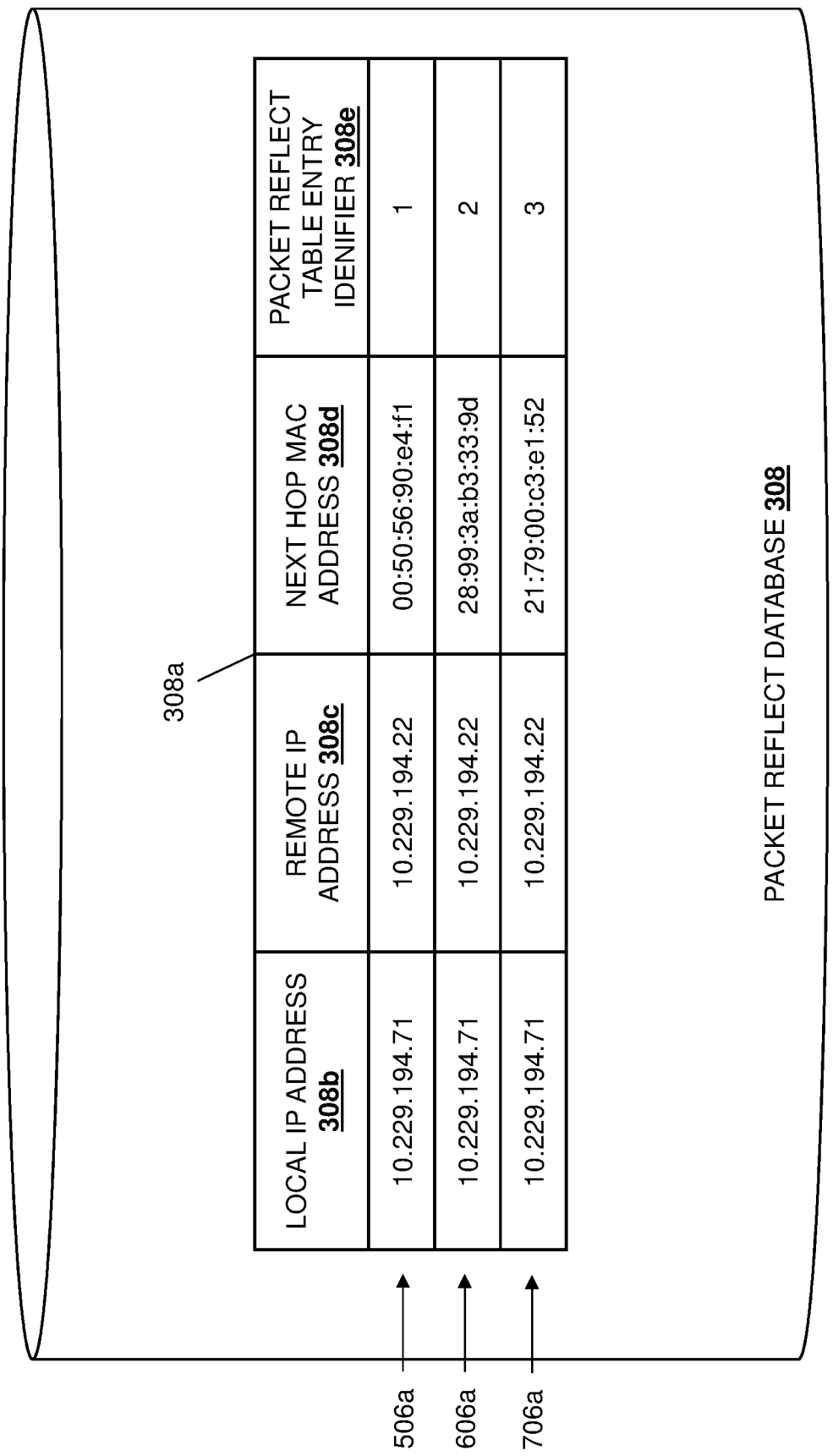
FIG. 7E is a schematic view illustrating an embodiment of a database in the server device of FIG. 3 during the method of FIG. 4.

With reference to FIGS. 5E, 6E, and 7E, a packet reflect table 308a is illustrated that may be included in the packet reflect database 308, and that includes a local IP address column 308b that may store the server device IP address of a server device that is the destination of a data packet for which a packet reflect table entry in the packet reflect table 308a is created, a remote IP address column 308c that may store the host device IP address of a host device that is the source of a data packet for which a packet reflect table entry in the packet reflect table 308a is created, a next-hop MAC address column 308d that may store the networking device MAC address of the networking device that transmits the data packet for which a packet reflect table entry in the packet reflect table 308a is created directly to the server device that receives that data packet, and a packet reflect table entry identifier column 308e that may store the packet reflect table entry identifiers discussed below.

As such, with reference to FIG. 5E and the particular performance of the method 400 described above with reference to FIGS. 5A-5D, in an embodiment of block 406 the packet reflect table entry creation operations 506 performed by the packet reflect engine 304 may include generating a packet reflect table entry 506a that includes a server device IP address ("10.229.194.71") of the server device 206 in the local IP address column 308b, a host device IP address ("10.229.194.22") of the host device 202 in the remote IP address column 308c, a router device MAC address ("00:50:56:90:e4:f1") of the router device 204a in the next-hop MAC address column 308d, and a packet reflect table entry identifier ("1") in the packet reflect table entry identifier column 308e. Similarly, with reference to FIG. 6E and the particular performance of the method 400 described above with reference to FIGS. 6A-6D (which one of skill in the art in possession of the present disclosure will recognize is performed subsequent to the particular performance of the method 400 described above with reference to FIGS. 5A-5E in this example), in an embodiment of block 406 the packet reflect table entry creation operations 606 performed by the packet reflect engine 304 may include generating a packet reflect table entry 606a that includes the server device IP address ("10.229.194.71") of the server device 206 in the local IP address column 308b, the host device IP address ("10.229.194.22") of the host device 202 in the remote IP address column 308c, a router device MAC address ("28: 99:3a:b3:33:9d") of the router device 204b in the next-hop MAC address column 308d, and a packet reflect table entry identifier ("2") in the packet reflect table entry identifier column 308e.

Similarly, with reference to FIG. 7E and the particular performance of the method 400 described above with reference to FIGS. 7A-7D (which one of skill in the art in possession of the present disclosure will recognize is performed subsequent to the particular performance of the method 400 described above with reference to FIGS. 6A-6E in this example), in an embodiment of block 406 the packet reflect table entry creation operations 706 performed by the packet reflect engine 304 may include generating a packet reflect table entry 706a that includes the server device IP address ("10.229.194.71") of the server device 206 in the local IP address column 308b, the host device IP address ("10.229.194.22") of the host device 202 in the remote IP address column 308c, a router device MAC address ("21: 79:00:c3:e1:52") of the router device 204c in the next-hop MAC address column 308d, and a packet reflect table entry identifier ("3") in the packet reflect table entry identifier column 308e. Furthermore, while the specific examples above utilize "1", "2", and "3" as the packet reflect table entry identifiers, as discussed below 8 bits/1 byte of data may be available for the packet reflect table entry identifiers in particular embodiments, and thus those packet reflect table entry identifiers may be expressed using a variety of numerical systems (e.g., binary) while remaining within the scope of the present disclosure.

Thus, one of skill in the art in possession of the present disclosure will appreciate how the packet reflect table 308a in the packet reflect database 308 in FIG. 7E illustrates a situation where the host device 202 has sent respective data packets to the server device 206 via the different router devices 204a, 204b, and 204c, which has resulted in respective packet reflect table entries 506a, 606a, and 706a having been created in the packet reflect table 308a in the packet reflect database 308. As discussed above, in similarly situations, conventional packet reflect functionality operates to utilize the packet reflect table entry that was generated the most recently (i.e., the packet reflect table entry 706a in this example), which can result in the transmission of an outgoing data packet via a router device that did not provide the corresponding incoming data packet (e.g., if the router device 204a were to transmit an incoming data packet from the host device 202 to the server device 206 and the server device 206 were to reply with an outgoing data packet in this situation, conventional packet reflect functionality would use the packet reflect entry 706a to transmit that outgoing data packet via the router device 204c). However, as discussed below, the respective packet reflect table entry identifiers "1", "2", and "3" provided in the packet reflect table entries may be utilized to identify which of the packet reflect entries to use when transmitting an outgoing data packet in order to ensure that outgoing data packet is transmitted via the router device that provided the corresponding incoming data packet.

If at decision block 406, it is determined that the host device address, the server device address, and the networking device address in the host Ethernet data packet are included in a packet reflect table entry in the packet reflect table, or following block 406, the method 400 proceeds to block 408 where the packet reflect engine in the server device generates a host IP data packet including an IP data packet header having the host device address, the server device address, and a packet reflect table entry identifier. With reference to the particular performance of the method 400 described above with reference to FIGS. 5A-5E, in an embodiment of block 408, the packet reflect engine 304 may generate a host IP data packet including an IP data packet header with the host device IP address of the host device 202 as its source IP address, the server device IP address of the server device 206 as its destination IP address, and may provide the packet reflect table entry identifier (e.g., "1" in this example) for the packet reflect table entry 506a in the Type of Service (Tos) field in the IP data packet header of that host IP data packet. Similarly, with reference to the particular performance of the method 400 described above with reference to FIGS. 6A-6E, in an embodiment of block 408, the packet reflect engine 304 may generate a host IP data packet including an IP data packet header with the host device IP address of the host device 202 as its source IP address, the server device IP address of the server device 206 as its destination IP address, and may provide the packet reflect table entry identifier (e.g., "2" in this example) for the packet reflect table entry 606a in the Type of Service (Tos) field in the IP data packet header of that host IP data packet.

Similarly as well, with reference to the particular performance of the method 400 described above with reference to FIGS. 7A-7E, in an embodiment of block 408, the packet reflect engine 304 may generate a host IP data packet including an IP data packet header with the host device IP address of the host device 202 as its source IP address, the server device IP address of the server device 206 as its destination IP address, and may provide the packet reflect table entry identifier (e.g., "3" in this example) for the packet reflect table entry 706a in the Type of Service (Tos) field in the IP data packet header of that host IP data packet. As will be appreciated by one of skill in the art in possession of the present disclosure, a ToS field is provided by the second byte in IP data packet headers (both in IPv4 and IPv6), and is conventionally utilized to specify IP data packet priority, request an IP data packet route (e.g., for low delay, high-throughput, high-reliability, etc.), and/or provide for other ToS functionality known in the art that may provide for the placement of the IP data packet in a prioritized outgoing queue, and/or the routing of the IP data packet with particular latency, throughout, or reliability.

However, the ToS field in IP data packet headers of IP data packets is not utilized by conventional NAS Input/Output (I/O) functionality in NAS server devices (e.g., the NAS server engine 306), and thus the packet reflect system of the present disclosure may utilize the ToS field to convey the packet reflect table entry identifiers discussed above. As such, the 8 bits/1 byte of space in the ToS field of IP data packets may be utilized for packet reflect table entry identifiers that, as discussed below, allow for retrieval of particular router device MAC addresses that are too big (e.g., 32 bits/4 bytes) to fit in the ToS field of IP data packets. However, while use of the ToS field in IP data packet headers of IP data packets for storing the packet reflect table entry identifiers is described as being used in this specific example based on its lack of use by NAS server devices, the packet reflect table entry identifiers may be provided in other locations in IP data packets that are not utilized by other packet processing subsystems in a computing device while remaining within the scope of the present disclosure as well.

Figure 5F:
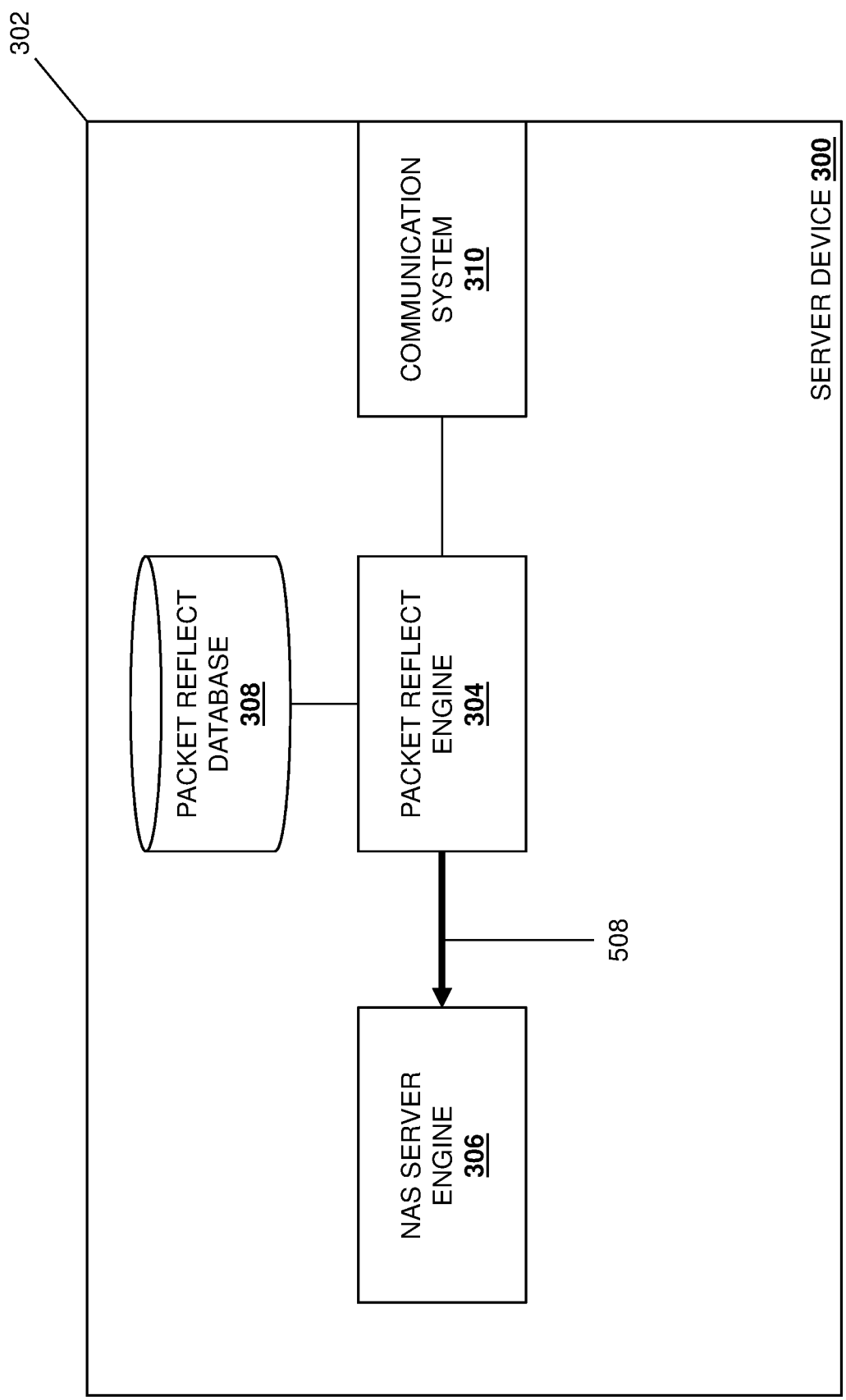
FIG. 5F is a schematic view illustrating an embodiment of the server device of FIG. 3 operating during the method of FIG. 4.
Figure 6F:
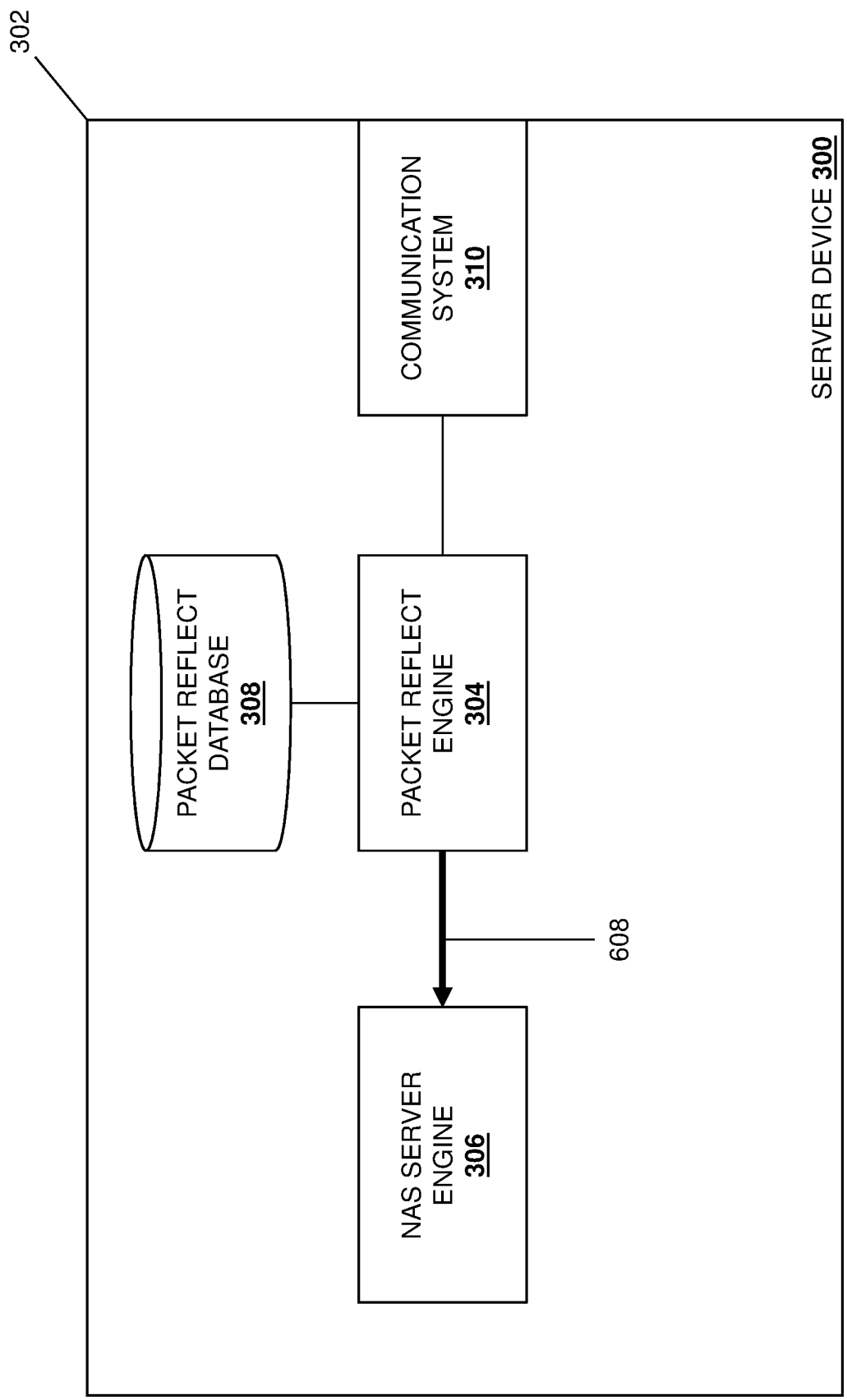
FIG. 6F is a schematic view illustrating an embodiment of the server device of FIG. 3 operating during the method of FIG. 4.
Figure 7F:
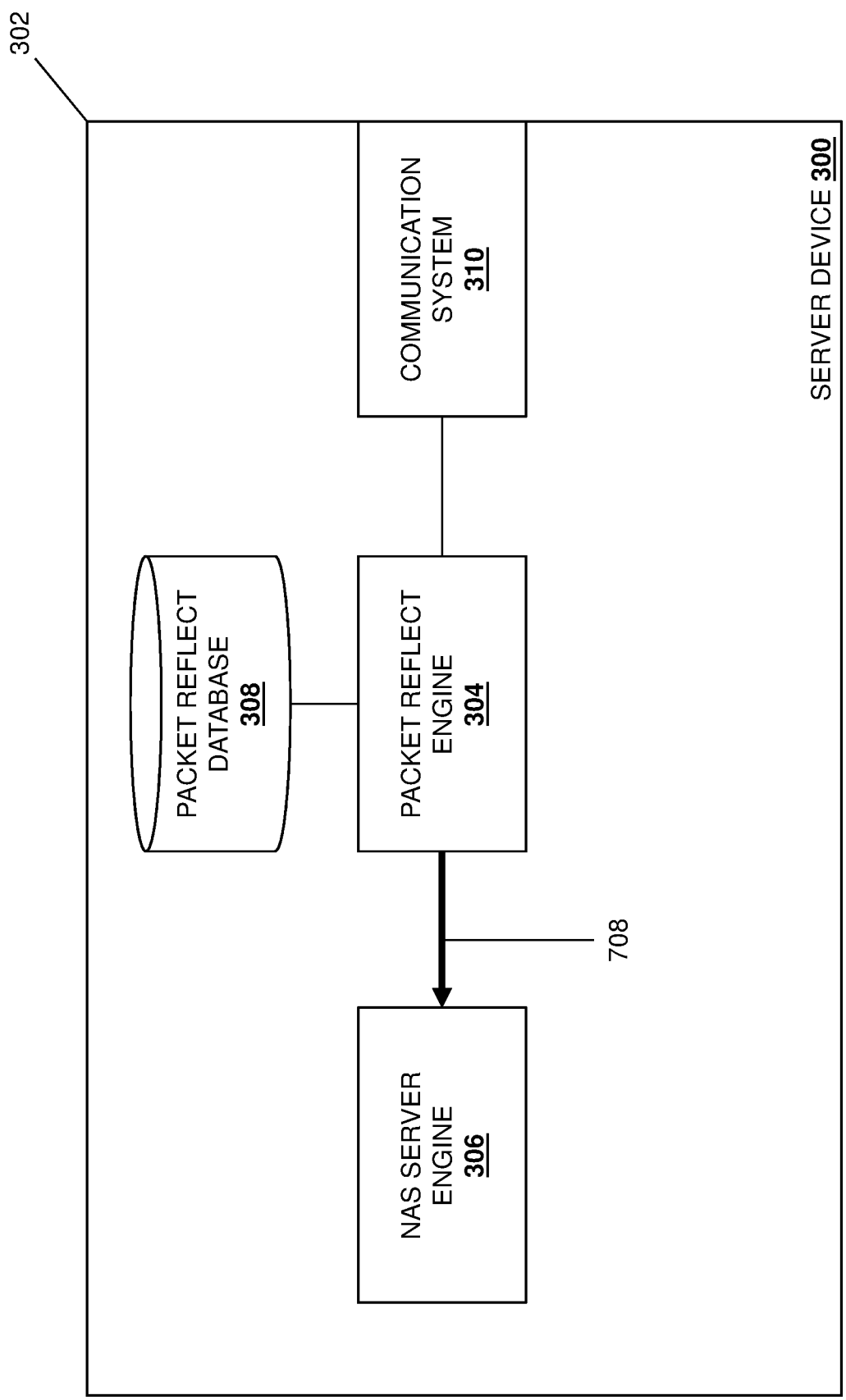
FIG. 7F is a schematic view illustrating an embodiment of the server device of FIG. 3 operating during the method of FIG. 4.

The method 400 then proceeds to block 410 where the packet reflect engine in the server device transmits the host IP data packet to a packet processing engine in the server device. With reference to FIG. 5F and the particular performance of the method 400 described above with reference to FIGS. 5A-5E, in an embodiment of block 410, the packet reflect engine 304 may perform host IP data packet transmission operations 508 to transmit the host IP data packet to the NAS server engine 306. Similarly, with reference to FIG. 6F and the particular performance of the method 400 described above with reference to FIGS. 6A-6E, in an embodiment of block 410, the packet reflect engine 304 may perform host IP data packet transmission operations 608 to transmit the host IP data packet to the NAS server engine 306. Similarly, with reference to FIG. 7F and the particular performance of the method 400 described above with reference to FIGS. 7A-7E, in an embodiment of block 410, the packet reflect engine 304 may perform host IP data packet transmission operations 708 to transmit the host IP data packet to the NAS server engine 306.

The method 400 then returns to block 402. As such, the method 400 may loop such that the host device 202 transmits host Ethernet data packets via the different router devices 204a-204c to the server device 206, the packet reflect engine 304 creates packet reflect table entries with packet reflect table entry identifiers that are unique to the router device from which that Ethernet data packet was received for any host Ethernet data packet that does not already have its host device IP address/server device IP address/router device MAC address combination included in a packet reflect table entry, generates respective host IP data packets for those host Ethernet data packets that include a packet reflect table entry identifier that identifies the packet reflect table entry corresponding to that host Ethernet data packet, and transmits the host IP data packets to NAS server engine 306.

Figure 8:
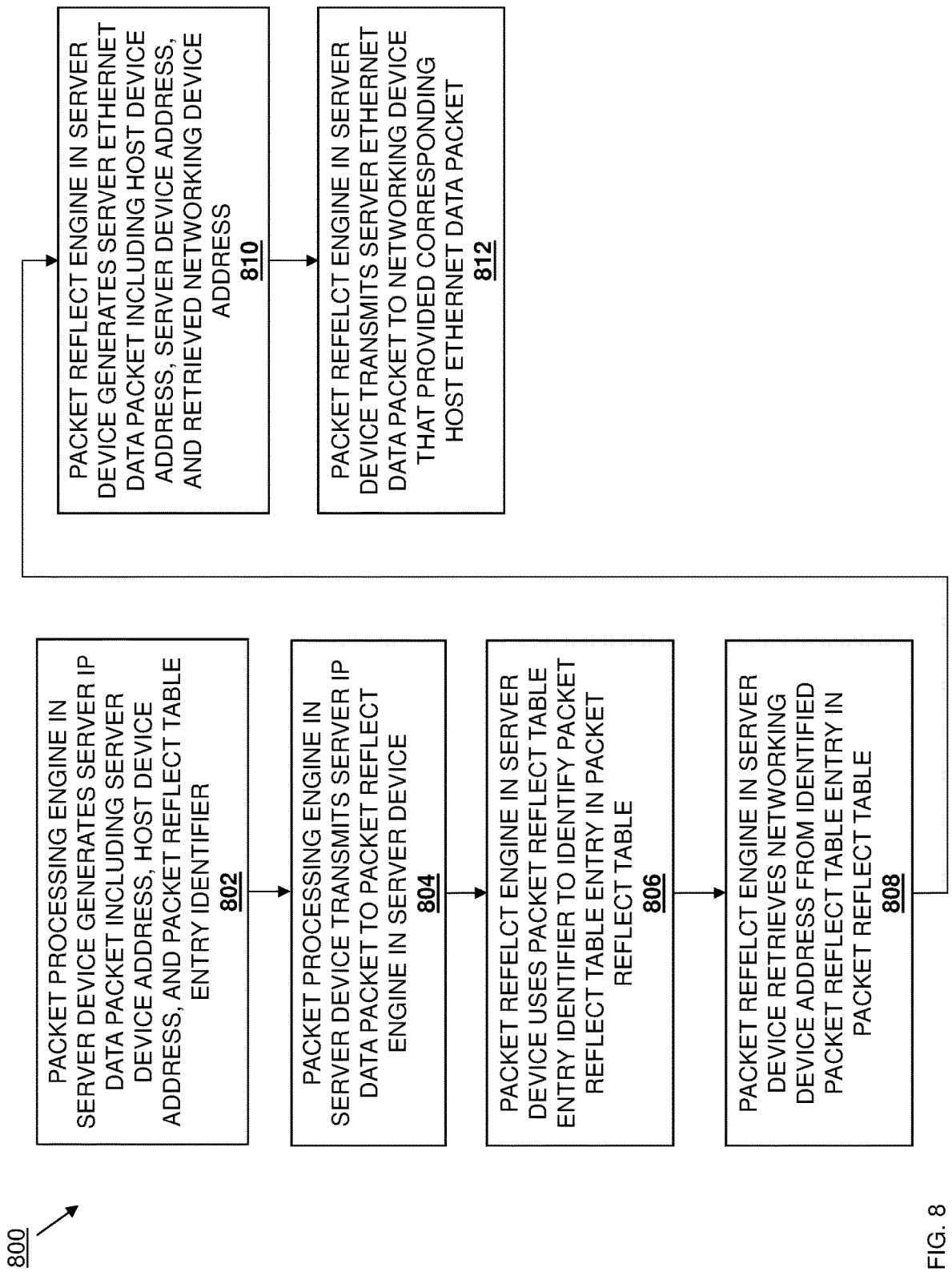
FIG. 8 is a flow chart illustrating an embodiment of a method for performing packet reflect operations

Referring now to FIG. 8, an embodiment of a method 800 for performing packet reflect operations is illustrated. As discussed below, the systems and methods of the present disclosure provide packet processing functionality that, in response to receiving a host IP data packets from packet reflect functionality as discussed above with regard to the method 400, generates a corresponding server IP data packet that includes the packet reflect table entry identifier included in that host IP data packet, and transmits that server IP data packets to the packet reflect functionality. The packet reflect functionality may then use the packet reflect table entry identifier to identify the corresponding packet reflect table entry in the packet reflect table, retrieve the networking device address from that packet reflect table entry, generate a server Ethernet data packet using that networking device address, and transmit that server Ethernet data packet to the networking device from which the corresponding host Ethernet data packet was received. For example, the packet reflect system of the present disclosure may include a packet processing subsystem in a server device that generates a server IP packet including an entry identifier that was provided in a host IP packet received from a packet reflect subsystem in the server device, and transmits it to the packet reflect subsystem. The packet reflect subsystem then uses the entry identifier to identify the entry in the packet reflect table, retrieves the networking device address from the entry, and generates and transmits a server Ethernet packet to the networking device using the networking device address. As such, multiple packet reflect table entries in a packet reflect table may be distinguished based on the networking device that transmitted the host Ethernet data packets from which those packet reflect table entries were created, allowing corresponding server Ethernet data packets to be transmitted back to the networking devices that provided those host Ethernet data packets.

In the specific example provided below, the server device 206 generates an outgoing data packet that corresponds to an incoming data packet that was generated by the host device 202 and that was transmitted via the router device 204a to the server device 206, and uses a packet reflect table entry identifier ("1") to ensure that the outgoing data packet is transmitted via the router device 204a to the host device 202. However, one of skill in the art in possession of the present disclosure will appreciate how the server device 206 may generate an outgoing data packet that corresponds to an incoming data packet that was generated by the host device 202 and that was transmitted via the router device 204b to the server device 206, and use a packet reflect table entry identifier ("2") to ensure that the outgoing data packet is transmitted via the router device 204b to the host device 202, as well as how the server device 206 may generate an outgoing data packet that corresponds to an incoming data packet that was generated by a host device 202 and that was transmitted via the router device 204c to the server device 206, and use the packet reflect table entry identifier ("3") to ensure that the outgoing data packet is transmitted via the router device 204c to the host device 202, while remaining within the scope of the present disclosure as well.

The method 800 begins at block 802 where a packet processing engine in a server device generates a server IP data packet including a server device address, a host device address, and a packet reflect table entry identifier. In an embodiment of block 802, the NAS server engine 306 may generate a server IP data packet that includes an IP data packet header having the server device IP address of the server device 206 as a source IP address, the host device IP address of the host device 202 as a destination IP address, and the packet reflect table entry identifier ("1") that were included in the IP data packet header of the host device IP data packet that it received during the particular performance of the method 400 described above with reference to FIGS. 5A-5F. For example, the packet reflect table entry identifier ("1") may be provided in the ToS field of the IP data packet header in the server IP data packet as discussed above, although the provisioning of the packet reflect table entry identifier ("1") in other locations in the server IP data packet is envisioned as falling within the scope of the present disclosure as well.

Figure 9A:
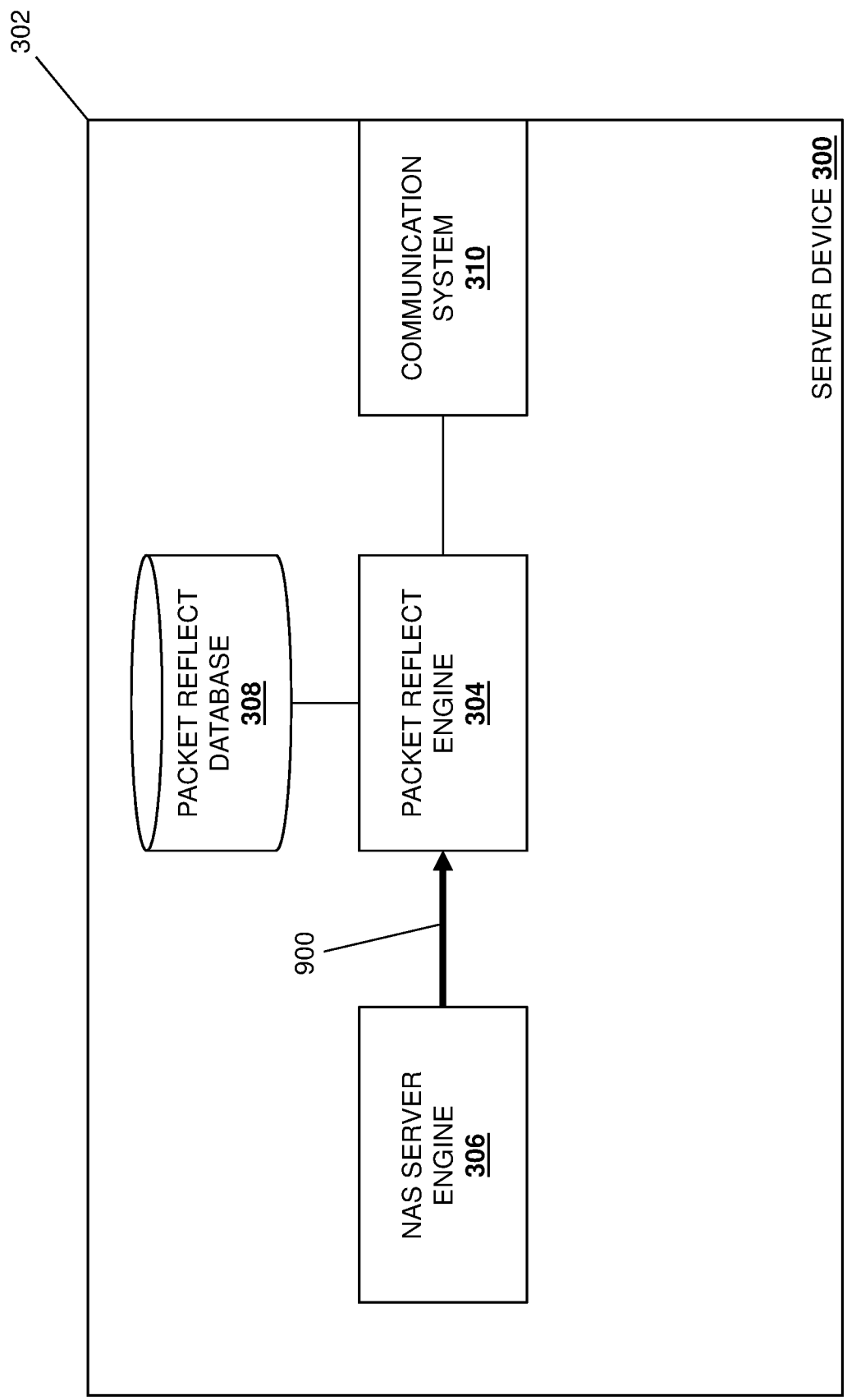
FIG. 9A is a schematic view illustrating an embodiment of the server device of FIG. 3 operating during the method of FIG. 8.

The method 800 then proceeds to block 804 where the packet processing engine in the server device transmits the server IP data packet to a packet reflect engine in the server device. With reference to FIG. 9A, in an embodiment of block 804, the NAS server engine 306 may perform server IP data packet transmission operations 900 that include transmitting the server IP data packet to the packet reflect engine 304.

Figure 9B:
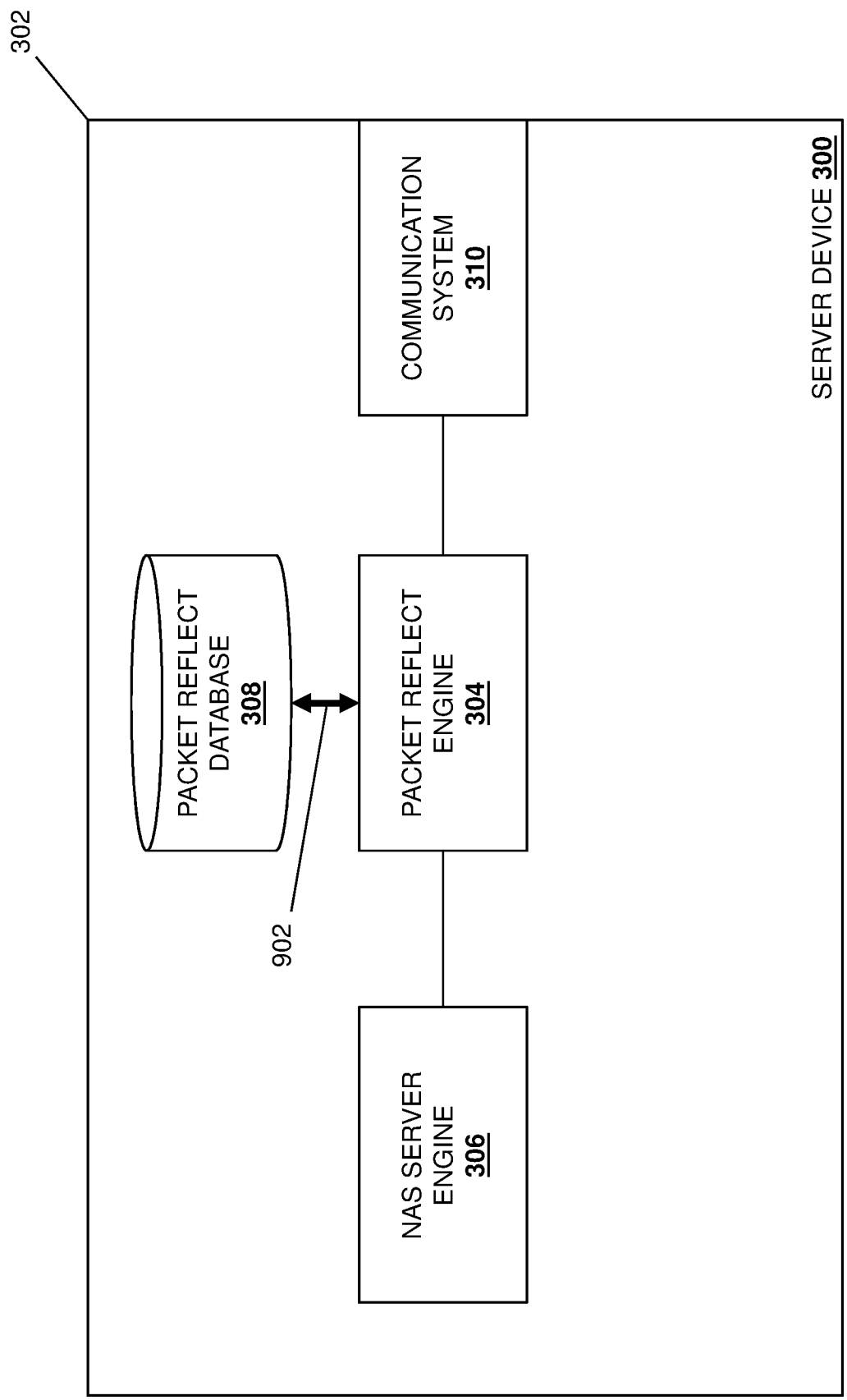
FIG. 9B is a schematic view illustrating an embodiment of the server device of FIG. 3 operating during the method of FIG. 8.

The method 800 then proceeds to block 806 where the packet reflect engine in the server device uses the packet reflect table entry identifier to identify a packet reflect table entry in a packet reflect table. With reference to FIG. 9B, in an embodiment of block 806 and in response to receiving the server IP data packet from the NAS server engine 306, the packet reflect engine 304 may perform packet reflect table entry identification operations 902 that identify a packet reflect table entry in the packet reflect table 308a that corresponds to the server IP data packet. While not illustrated or described herein, one of skill in the art in possession of the present disclosure will appreciate that when the IP data packet header in the server IP data packet includes the server device IP address of the server device 206 as a source IP address and the host device IP address of the host device 202 as a destination IP address, and there is only one packet reflect table entry in the packet reflect table 308a that includes that server device IP address and that host device IP address, the packet reflect engine 304 may identify that packet reflect table entry as corresponding to the server IP data packet.

However, in the event there are multiple packet reflect table entries in the packet reflect table 308a that includes the server device IP address and the host device IP address included in an IP data packet header of a received server IP data packet, the packet reflect engine 304 may perform the packet reflect table entry identification operations 902 that include retrieving the packet reflect table entry identifier ("1") from the IP data packet header of the server IP data packet (e.g., from the ToS field in the IP data packet header of the server IP data packet), accessing the packet reflect database 308, and identifying the packet reflect table entry in the packet reflect table that corresponds to that packet reflect table entry identifier ("1"). Thus, with reference back to FIG. 7E, the packet reflect engine 304 may identify the packet reflect table entry 506a in the packet reflect table 308a that corresponds to the packet reflect table entry identifier ("1").

In the example provided above with regard to the method 400, the packet reflect table entry 706a was created in the packet reflect table 308a subsequent to the packet reflect table entry 606a, and the packet reflect table entry 606a was created in the packet reflect table 308a subsequent to the packet reflect table entry 506a. As discussed above, in similar situations conventional packet reflect systems would identify the packet reflect table entry 706a in response to receiving an outgoing data packet that included the local IP address and remote IP address (in the local IP address column 308b and the remote IP address column 308c) in that packet reflect table entry 706a due to that packet reflect table entry 706a being the most recently created packet reflect table entry. However, as described above, the packet reflect table entry identifiers ("1", "2", and "3") allow packet reflect table entries to be identified based on the specific incoming data packet (e.g., the host IP data packet described above) and regardless of the order in which those packet reflect table entries were created in the packet reflect table 308a.

The method 800 then proceeds to block 808 where the packet reflect engine in the server device retrieves a networking device address from the identified packet reflect table entry in the packet reflect table. In an embodiment, at block 808, the packet reflect table entry identification operations 902 may also include the packet reflect engine 304 retrieving the router device MAC address (e.g., "00:50:56:90:e4:f1") of the router device 204a from the packet reflect table entry 506a that was identified in the packet reflect table 308a using the packet reflect table entry identifier ("1") at block 806.

The method 800 then proceeds to block 810 where the packet reflect engine in the server device generates a server Ethernet data packet including the host device address, the server device address, and the retrieved networking device address. In an embodiment, at block 810, the packet reflect engine 304 may use the server IP data packet to generate a server Ethernet data packet that includes an Ethernet data packet header having the server device IP address of the server device 202 as a source IP address, the host device IP address of the host device 202 as a destination IP address, and the router device MAC address of the router device 204a that was retrieved at block 808. Furthermore, in a specific example, while the ToS field in the server IP data packet included the packet reflect table entry identifier ("1"), the ToS field in the server Ethernet data packet that is generated at block 810 may be set to a default value (e.g., "0"), and the Ethernet data packet header checksum for the server Ethernet data packet may be recalculated as compared to the IP data packet header checksum for the server IP data packet.

Figure 9C:
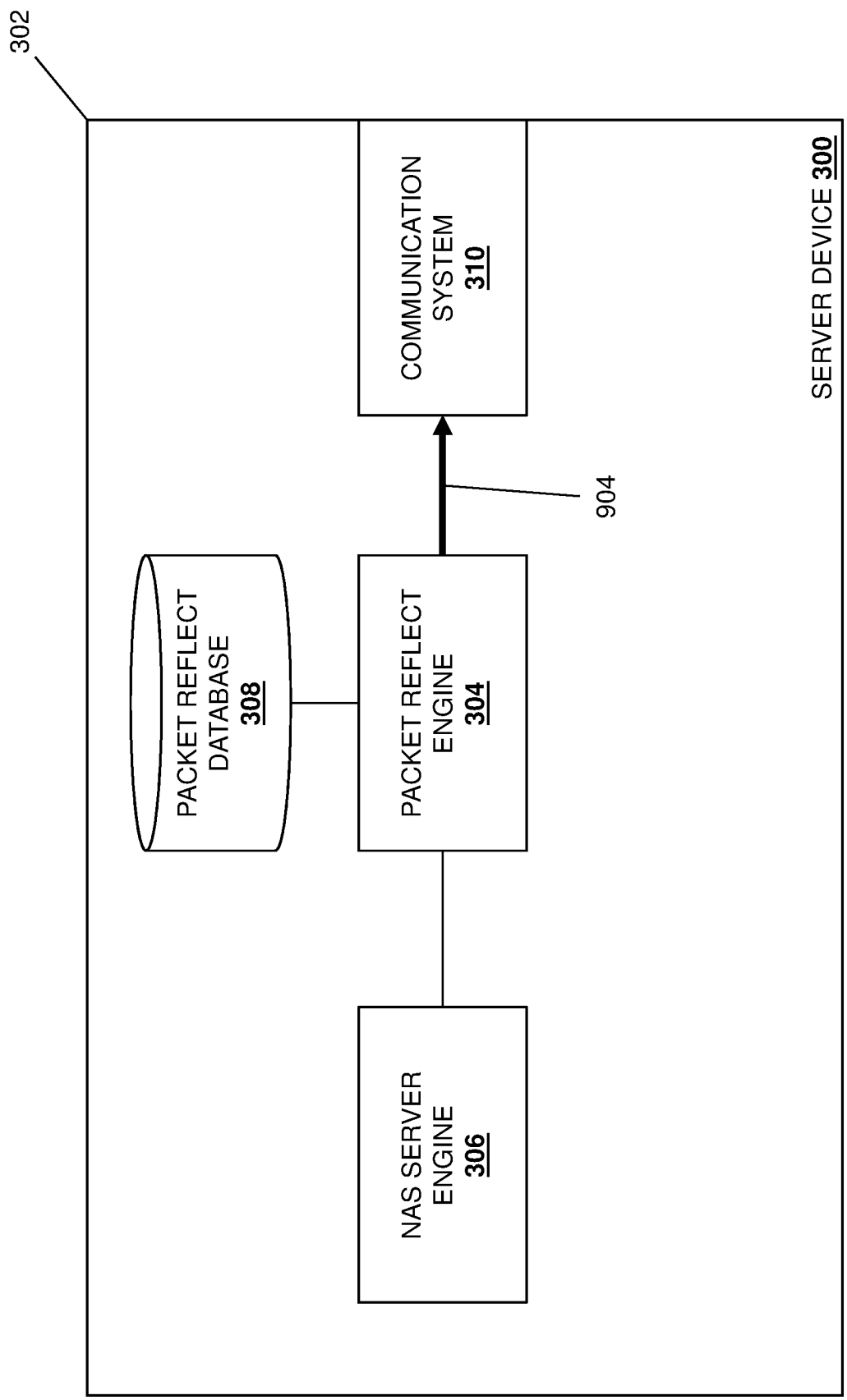
FIG. 9C is a schematic view illustrating an embodiment of the server device of FIG. 3 operating during the method of FIG. 8.
Figure 9D:
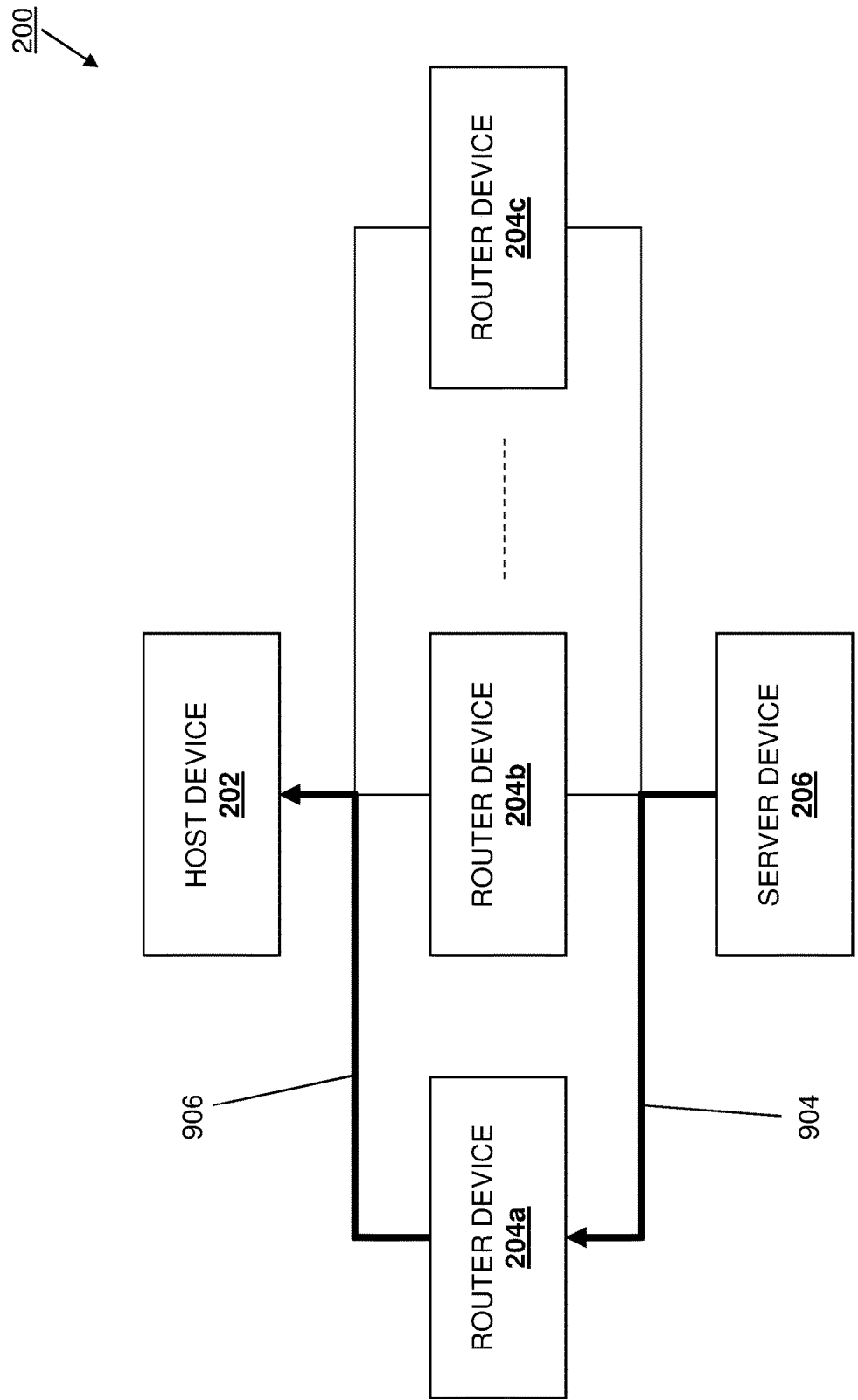
FIG. 9D is a schematic view illustrating an embodiment of the networked system of FIG. 2 operating during the method of FIG. 8.

The method 800 then proceeds to block 812 where the packet reflect engine in the server device transmits the server Ethernet data packet to the networking device that provided the corresponding host Ethernet data packet. With reference to FIGS. 9C and 9D, in an embodiment of block 812, the packet reflect engine 304 may perform server Ethernet data packet transmission operations 904 that include transmitting the server Ethernet data packet via its communication system 310 and to the router device 204a, which one of skill in the art in possession of the present disclosure will appreciate may be enabled via the inclusion of the router device MAC address of the router device 204a in the server Ethernet data packet. The router device 204a may then perform server Ethernet data packet forwarding operations 906 that include forwarding the server Ethernet data packet to the host device 202.

Thus, systems and methods have been described that provide packet reflect functionality that, in response to receiving host Ethernet data packets from different router devices, creates packet reflect table entries in a packet reflect table that are configured to be identified by packet reflect table entry identifiers that distinguish between the different router device MAC addresses of the different router devices from which those host Ethernet data packets were received, generates corresponding host IP data packets that include the packet reflect table entry identifier generated for their corresponding host Ethernet data packet, and transmits those host IP data packets to NAS functionality. For example, the packet reflect system of the present disclosure may include a packet reflect subsystem in a NAS server device that receives a host Ethernet packet generated by a host from a router device, provides an entry in a packet reflect table that includes a router device MAC address from the host Ethernet packet, generates a host IP packet based on the host Ethernet packet and including an entry identifier for the entry, and transmits the host IP packet to a NAS subsystem in the NAS server device.

In response to receiving a host IP data packets from packet reflect functionality, the NAS functionality generates a corresponding NAS server IP data packet that includes the packet reflect table entry identifier included in that host IP data packet, and transmits that NAS server IP data packet to the packet reflect functionality. The packet reflect functionality may then use the packet reflect table entry identifier to identify the corresponding packet reflect table entry in the packet reflect table, retrieve the router device MAC address from that packet reflect table entry, generate a NAS server Ethernet data packet using that router device MAC address, and transmit that NAS server Ethernet data packet to the router device from which the corresponding host Ethernet data packet was received. For example, the packet reflect system of the present disclosure may include a NAS subsystem in a NAS server device that generates a NAS server IP packet including an entry identifier that was provided in a host IP packet received from a packet reflect subsystem in the NAS server device, and transmits it to the packet reflect subsystem. The packet reflect subsystem then uses the entry identifier to identify the entry in the packet reflect table, retrieves the router device MAC address from the entry, and generates and transmits a NAS server Ethernet packet to the router device using the router device MAC address. As such, multiple packet reflect table entries in a packet reflect table may be distinguished based on the router device that transmitted the host Ethernet data packets from which those packet reflect table entries were created, allowing corresponding NAS server Ethernet data packets to be transmitted back to the router devices that provided those host Ethernet data packets.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for performing packet reflect operations, comprising:
   receiving, by a packet reflect subsystem in a server device from a first networking device, a first host Ethernet data packet that was generated by a host device;
   providing, by the packet reflect subsystem in a packet reflect table based on the first host Ethernet data packet, a first packet reflect table entry that includes a first networking device address of the first networking device from which the first host Ethernet data packet generated by the host device was received;
   generating, by the packet reflect subsystem based on the first host Ethernet data packet, a first host Internet Protocol (IP) data packet that includes a first packet reflect table entry identifier for the first packet reflect table entry in a Type of Service (ToS) field in the first host IP data packet;
   transmitting, by the packet reflect subsystem to a packet processing subsystem in the server device, the first host IP data packet;
   receiving, by the packet reflect subsystem from the packet processing subsystem, a first server device IP data packet including the first packet reflect table entry identifier for the first packet reflect table entry in a ToS field in the first server device IP data packet;
   using, by the packet reflect subsystem, the first packet reflect table entry identifier to identify the first packet reflect table entry in the packet reflect table;
   retrieving, by the packet reflect subsystem from the first packet reflect table entry, the first networking device address; and
   generating and transmitting, by the packet reflect subsystem using the first networking device address, a first server device Ethernet data packet to the first networking device from which the first host Ethernet data packet generated by the host device was received.

2. The method of claim 1, wherein the first host Ethernet data packet includes a host device address of the host device as a source IP address, a server device address of the server device as a destination IP address, and the first networking device address as a next hop Media Access Control (MAC) address.

3. The method of claim 2, wherein the first packet reflect table entry associates the host device address, the server device address, and the first networking device address.

4. The method of claim 1, wherein the first host IP data packet includes a host device address of the host device as a source IP address and a server device address of the server device as a destination IP address.

5. The method of claim 1, wherein the first server device IP data packet includes a server device address of the server device as a source IP address and a host device address of the host device as a destination IP address.

6. The method of claim 1, wherein the first server device Ethernet data packet includes a server device address of the server device as a source IP address, a host device address of the host device as a destination IP address, and the first networking device address as a next hop Media Access Control (MAC) address.

7. The method of claim 1, further comprising:
   receiving, by the packet reflect subsystem from a second networking device, a second host Ethernet data packet that was generated by the host device;
   providing, by the packet reflect subsystem in the packet reflect table based on the second host Ethernet data packet, a second packet reflect table entry that includes a second networking device address of the second networking device from which the second host Ethernet data packet generated by the host device was received;
   generating, by the packet reflect subsystem based on the second host Ethernet data packet, a second host IP data packet that includes a second packet reflect table entry identifier for the second packet reflect table entry in a ToS field in the second host IP data packet;
   transmitting, by the packet reflect subsystem to the packet processing engine, the second host IP data packet;
   receiving, by the packet reflect subsystem from the packet processing engine, a second server device IP data packet including the second packet reflect table entry identifier for the second packet reflect table entry in a ToS field in the second server device IP data packet;
   using, by the packet reflect subsystem, the second packet reflect table entry identifier to identify the second packet reflect table entry in the packet reflect table;
   retrieving, by the packet reflect subsystem from the second packet reflect table entry, the second networking device address; and
   generating and transmitting, by the packet reflect subsystem using the second networking device address, a second server device Ethernet data packet to the second networking device from which the second host Ethernet data packet generated by the host device was received.

8. A packet reflect system, comprising:
   a packet reflect subsystem that is included in a server device and that is configured to:
      receive, from a networking device, a host Ethernet data packet that was generated by a host device;
      provide, in a packet reflect table based on the host Ethernet data packet, a packet reflect table entry that includes a networking device address of the networking device from which the host Ethernet data packet generated by the host device was received;
      generate, based on the host Ethernet data packet, a host Internet Protocol (IP) data packet that includes a packet reflect table entry identifier for the packet reflect table entry in a Type of Service (ToS) field in the host IP data packet; and
      transmit the host IP data packet; and
   a packet processing subsystem that is included in the server device and that is configured to:
      receive, from the packet reflect subsystem, the host IP data packet;

generate a server IP data packet that includes the packet reflect table entry identifier for the packet reflect table entry in a ToS field in the server IP data packet; and transmit, to the packet reflect subsystem, the server IP data packet, wherein the packet reflect subsystem is configured to:
  receive, from the packet processing subsystem, the server IP data packet;
  use the packet reflect table entry identifier in the ToS field in server IP data packet to identify the packet reflect table entry in the packet reflect table;
  retrieve, from the packet reflect table entry, the networking device address; and
  generate and transmit, using the networking device address, a server Ethernet data packet to the networking device from which the host Ethernet data packet generated by the host device was received.

9. The system of claim 8, wherein the host Ethernet data packet includes a host device address of the host device as a source IP address, a server device address of the server device as a destination IP address, and the networking device address as a next hop Media Access Control (MAC) address.

10. The system of claim 9, wherein the packet reflect table entry associates the host device address, the server device address, and the networking device address.

11. The system of claim 8, wherein the host IP data packet includes a host device address of the host device as a source IP address and a server device address of the server device as a destination IP address.

12. The system of claim 8, wherein the server IP data packet includes a server device address of the server device as a source IP address and a host device address of the host device as a destination IP address.

13. The system of claim 8, wherein the server Ethernet data packet includes a server device address of the server device as a source IP address, a host device address of the host device as a destination IP address, and the networking device address as a next hop Media Access Control (MAC) address.

14. An Information Handling System (IHS), comprising:
  a processing system; and
  a memory system that is coupled to the processing system and that includes instructions that, when executed by the processing system, cause the processing system to provide a packet reflect engine that is configured to:
    receive, from a first networking device, a first host Ethernet data packet that was generated by a host device;
    provide, in a packet reflect table based on the first host Ethernet data packet, a first packet reflect table entry that includes a first networking device address of the first networking device from which the first host Ethernet data packet generated by the host device was received;
    generate, based on the first host Ethernet data packet, a first host Internet Protocol (IP) data packet that includes a first packet reflect table entry identifier for the first packet reflect table entry in a Type of Service (ToS) field in the first host IP data packet;
    transmit, to a packet processing engine, the first host IP data packet;
    receive, from the packet processing engine, a first IHS IP data packet including the first packet reflect table entry identifier for the first packet reflect table entry in a ToS field in the first IHS IP data packet;
    use the first packet reflect table entry identifier to identify the first packet reflect table entry in the packet reflect table;
    retrieve, from the first packet reflect table entry, the first networking device address; and
    generate and transmit, using the first networking device address, a first IHS Ethernet data packet to the first networking device from which the first host Ethernet data packet generated by the host device was received.

15. The IHS of claim 14, wherein the first host Ethernet data packet includes a host device address of the host device as a source IP address, an IHS address of the IHS as a destination IP address, and the first networking device address as a next hop Media Access Control (MAC) address.

16. The IHS of claim 15, wherein the first packet reflect table entry associates the host device address, the IHS address, and the first networking device address.

17. The IHS of claim 14, wherein the first host IP data packet includes a host device address of the host device as a source IP address and an IHS address of the IHS as a destination IP address.

18. The IHS of claim 14, wherein the first IHS IP data packet includes an IHS address of the IHS as a source IP address and a host device address of the host device as a destination IP address.

19. The IHS of claim 14, wherein the first IHS Ethernet data packet includes an IHS address of the IHS as a source IP address, a host device address of the host device as a destination IP address, and the first networking device address as a next hop Media Access Control (MAC) address.

20. The IHS of claim 14, wherein packet reflect engine that is configured to:
  receive, from a second networking device, a second host Ethernet data packet that was generated by the host device;
  provide, in the packet reflect table based on the second host Ethernet data packet, a second packet reflect table entry that includes a second networking device address of the second networking device from which the second host Ethernet data packet generated by the host device was received;
  generate, based on the second host Ethernet data packet, a second host IP data packet that includes a second packet reflect table entry identifier for the second packet reflect table entry in a ToS field in the second host IP data packet;
  transmit, to the packet processing engine, the second host IP data packet;
  receive, from the packet processing engine, a second IHS IP data packet including the second packet reflect table entry identifier for the second packet reflect table entry in a ToS field in the second IHS IP data packet;
  use the second packet reflect table entry identifier to identify the second packet reflect table entry in the packet reflect table;
  retrieve, from the second packet reflect table entry, the second networking device address; and
  generate and transmit, using the second networking device address, a second IHS Ethernet data packet to the second networking device from which the second host Ethernet data packet generated by the host device was received.

* * * * *